United States Patent [19]

Nakada

[11] Patent Number: 4,690,549
[45] Date of Patent: Sep. 1, 1987

[54] APPARATUS FOR DETECTING DISTANCE TO AN OBJECT

[75] Inventor: Yasuo Nakada, Isehara, Japan

[73] Assignee: Sony Corporation, Tokyo, Japan

[21] Appl. No.: 824,946

[22] Filed: Feb. 3, 1986

Related U.S. Application Data

[63] Continuation of Ser. No. 436,614, Oct. 25, 1982, abandoned.

[30] Foreign Application Priority Data

Oct. 26, 1981 [JP] Japan .............................. 56-171204
Oct. 27, 1981 [JP] Japan .............................. 56-171755

[51] Int. Cl.[4] .................... G01C 3/08; G03B 13/20
[52] U.S. Cl. ................................ 356/4; 354/402; 354/408
[58] Field of Search ................. 356/4; 354/407, 408, 354/402; 250/201

[56] References Cited

U.S. PATENT DOCUMENTS

| | | | |
|---|---|---|---|
| 3,227,033 | 1/1966 | Whyte | 356/4 |
| 3,618,498 | 11/1971 | Eppinger | 356/166 |
| 4,253,752 | 3/1981 | Ichihara | 356/4 |
| 4,283,138 | 8/1981 | Lai | 356/28 |
| 4,311,383 | 1/1982 | Ohtsubo | 356/28 |
| 4,346,970 | 8/1982 | Kawabata et al. | 354/407 |
| 4,360,256 | 11/1982 | Grassl | 354/155 |

Primary Examiner—Stephen C. Buczinski
Assistant Examiner—Gregory C. Issing
Attorney, Agent, or Firm—Lewis H. Eslinger; Alvin Sinderbrand

[57] ABSTRACT

An apparatus for detecting distance to an object is disclosed, which includes a taking or imaging lens for collecting a light from an object, a first lens device for forming the light from the object and through the taking lens to a parallel light bundle when the object is positioned at the focal point of the taking lens, a second lens device for focussing the light through the first lens device, a light sensing device for receiving the light through the second lens device, a separating device for separating the light from the first lens device into at least two bundles of light which are shifted perpendicularly to the optical axis of the second lens device, and a detecting device for detecting the displacement of the multiple images on the light sensing device caused by the separated bundles of light by the separating device when the object is not at the focal point of the taking lens and for generating an output varying with the distance to the object.

19 Claims, 28 Drawing Figures

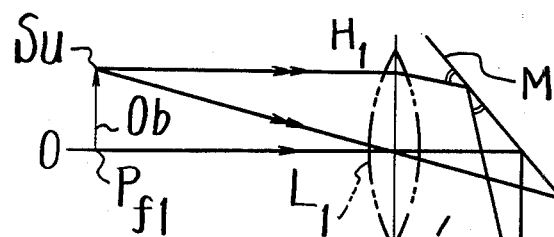
FIG. 2A
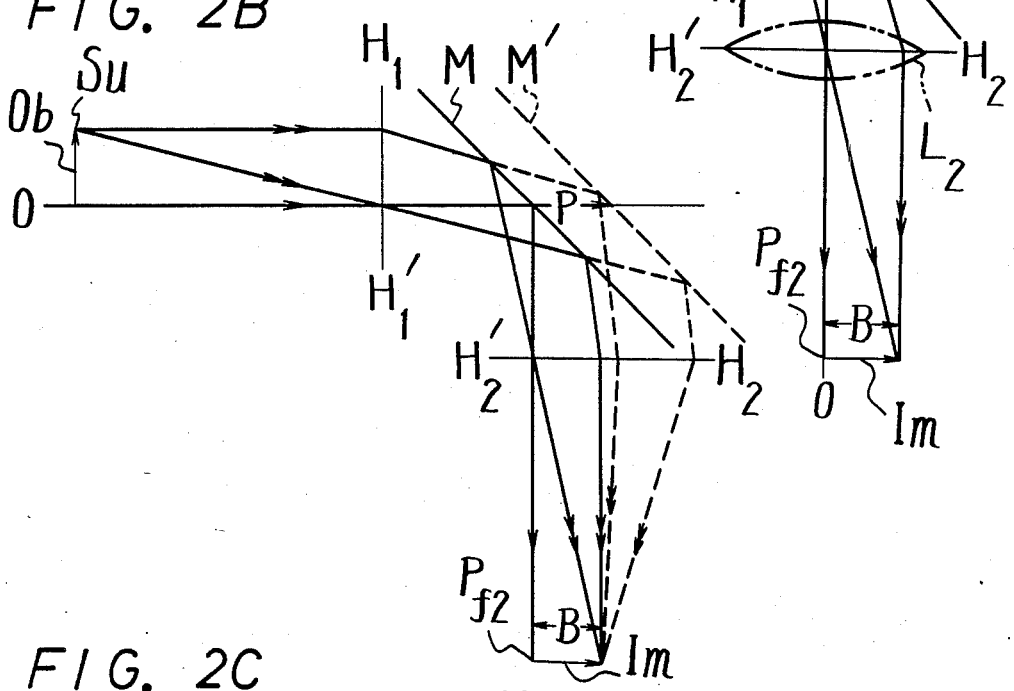
FIG. 2B
FIG. 2C
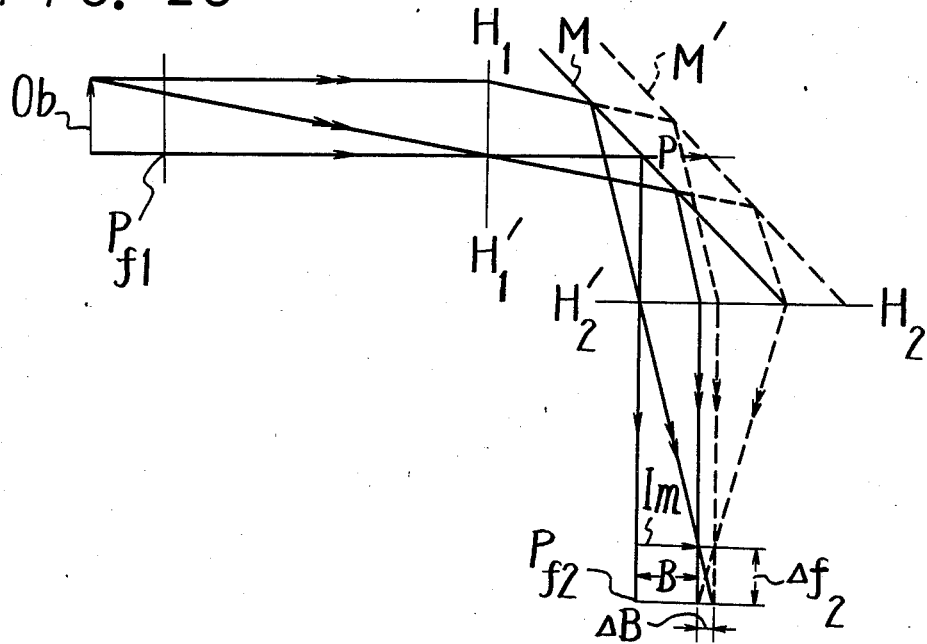

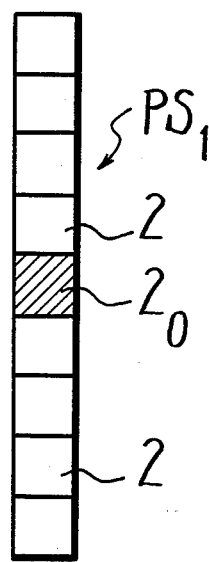
FIG. 4A
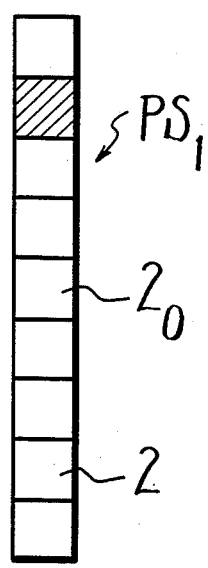
FIG. 4B
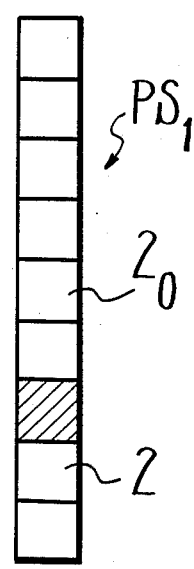
FIG. 4C
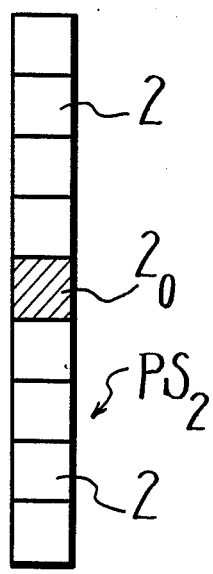
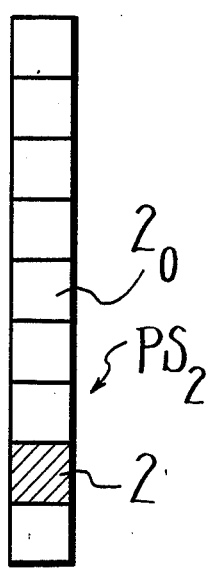
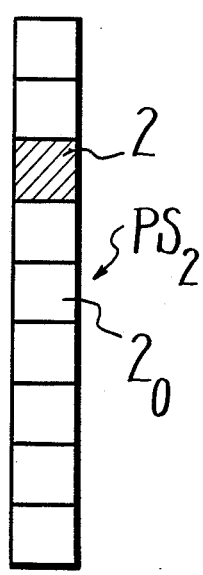

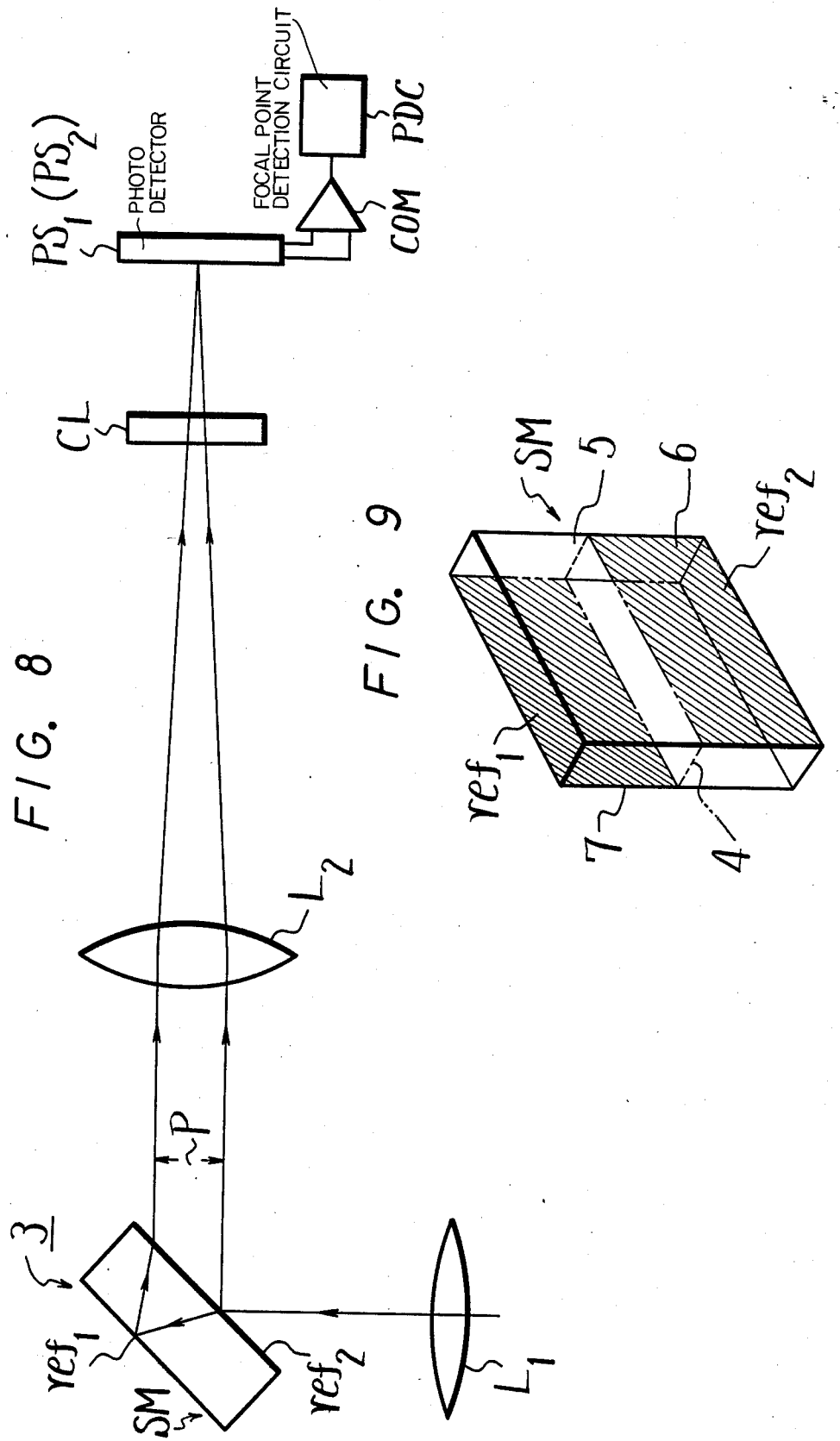

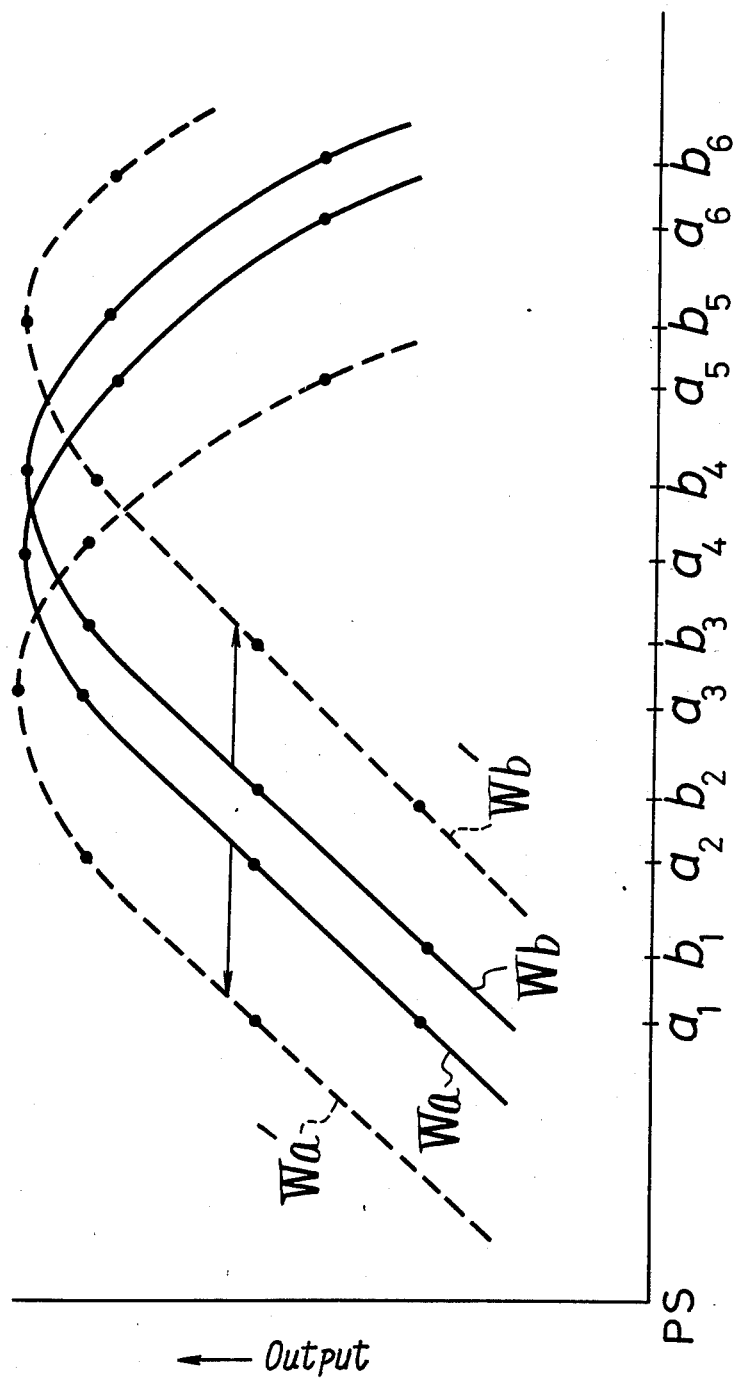

APPARATUS FOR DETECTING DISTANCE TO AN OBJECT

This is a continuation of application Ser. No. 436,614, filed Oct. 25, 1982, abandoned.

BACKGROUND OF THE INVENTION

1. Field of the Invention

This invention generally relates to a method and an apparatus for detecting distance to an object and more particularly relates to a method and an apparatus for detecting distance to an object with high precision.

2. Description of the Prior Art

Recently, various auto focus cameras which can automatically detect the distance to an object have been developed, and an ultrasonic type auto focus camera is one of such cameras. With the ultrasonic type auto focus camera, when its shutter is released, an ultrasonic wave is directed toward an object from the camera and then the camera receives the ultrasonic wave reflected by the object, whereby the time required by the ultrasonic wave from its emission from the camera until its arrival at the camera again is detected to measure the distance between the camera and the object. Then, a taking or imaging lens incorporated in the camera is suitably moved to automatically focus the camera. Such an ultrasonic type auto focus camera has the advantage that precision of detection of the distance to the object from the camera is not dependent on the brightness and contrast of the object. But, it has a defect in that different results will be brought about depending on whether the object is picked up by the camera from the front or from the oblique side. And when the object is picked up through a window, the distance to the object can not be detected but the distance to the window is detected.

Another type of auto focus camera, a so-called triangulation type camera, generally comprises a fixed mirror and a movable mirror being operated with the taking lens, both being incorporated therein. In the camera, these fixed and movable mirrors are located to reflect light from the front of the camera to two faces of a prism perpendicular to each other, and the light from the fixed mirror and the movable mirror are reflected by the prism and introduced to the light receiving screen of a light receiver. Then, the positional relation between the image of the object from the fixed mirror and the image of the object from the movable mirror, which are both projected onto the light receiving screen of the light receiver, is detected. The movable mirror is rotatably or obliquely moved to bring the positional relation between the images from the two mirrors into a predetermined relation thereby moving the taking lens to the front and rear corresponding to the movement of the movable mirror to focus the camera. In accordance with such an auto focus camera, whether the object is picked up from the front or oblique direction, the focal point can be properly adjusted at all times. Moreover, even when the object is picked up through a window, accurate focusing is possible. However, in the known triangulation type auto focus camera, since the image of the object passed through the taking lens is focussed on a film on the basis of the results of detecting the distance between the object and the camera measured by a rangefinder optical system, which is located separately from the taking lens, parallax will occur. Hence such a camera is quite unsuitable especially for a camera using a zoom lens.

Furthermore, this camera also poses a problem in that a special motor is required to drive the movable mirror. In a still picture camera, if a spring or the like is used, the movable mirror can be driven. But, in the case of a camera for animation, where the position of the focal point is varied at all times, a motor must be used for driving the movable mirror, thus giving rise to problems of noise and increases in power consumption, size and cost, none of can be neglected.

OBJECTS AND SUMMARY OF THE INVENTION

Accordingly, an object of this invention is to provide a novel method and apparatus for detecting a distance to an object which can obviate the aforesaid defects inherent in the conventional apparatus.

Another object of this invention is to detect distance to an object with high precision.

Still another object of this invention is to detect distance to an object by utilizing the light passed through a taking lens optical system, thereby giving rise to no parallax.

A further object of this invention is to detect distance to an object without using movable parts so that the mechanical arrangement and the structure are simple, thus the apparatus being easily compact-sized.

A still further object of this invention is to provide an apparatus for detecting distance to an object whose power consumption is reduced.

Yet a further object of this invention is to provide an apparatus for detecting distance to an object which is particularly suitable for use with a video camera and an eight-mm camera.

The other objects, features and advantages of the present invention will become apparent from the following description taken in conjunction with the accompanying drawings.

BRIEF DESCRIPTION OF THE DRAWINGS

FIGS. 2A to 2C are schematic diagrams used to explain a principle of operation of means for shifting a light perpendicular to an optical axis of a lens using a mirror;

FIGS. 4A–4C illustrate a photo sensor or photo detector utilized in the embodiment shown in FIG. 3;

FIG. 8 is a top view illustrating the embodiment in FIG. 7;

FIG. 9 is a perspective view illustrating a step mirror used in the embodiment of this invention shown in FIGS. 7 and 8;

FIG. 18 is a characteristic curve diagram indicating an output of a light receiving element or a light sensing element in the embodiment shown in FIGS. 15–17.

DESCRIPTION OF THE PREFERRED EMBODIMENTS

Hereinafter, an optical principle that the present invention utilizes will be described, and thereafter, embodiments of an apparatus for detecting a distance to an object according to this invention will be described with reference to the attached drawings.

First, an optical principle which is utilized by this invention will be described with reference to FIGS. 1A through 1D.

Each of FIGS. 1A to 1D is a diagram schematically showing the locus of a light from an object Ob when convex lenses $L_1$ and $L_2$ with the same focal length $f_1$ and $f_2$ are placed parallel to each other and apart with a distance D the same as the focal length $f_1$ or $f_2$, where $H_1$—$H_1'$ represents the principal plane of the convex lens $L_1$ adjacent to the object Ob, $H_2$—$H_2'$ represents the principal plane of the convex lens $L_2$ adjacent to an image Im, and O—O represents the optical axis of the convex lenses $L_1$ and $L_2$.

Figure 1A:
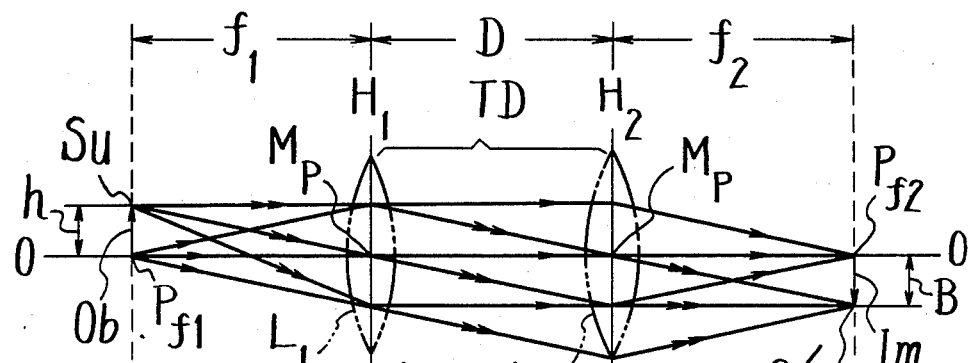
FIGS. 1A to 1D are respectively schematic diagrams useful for explaining an optical principle utilized in this invention.

As shown in FIG. 1A, when the object Ob with a height h is positioned at the focal point $P_{f1}$ of the convex lens $L_1$, light rays from a certain point of the object Ob are parallel within an area TD between two convex lenses $L_1$ and $L_2$. To be more concrete, light from the lower end of the object Ob, which is positioned at the focal point $P_{f1}$ of the convex lens $L_1$, advances as shown by the single arrow rays, which are refracted parallel to the optical axis O—O of two convex lenses $L_1$ and $L_2$ in the area TD between the two convex lenses $L_1$ and $L_2$, and then passed through the lens $L_2$ to be collected or converged at the focal point $P_{f2}$ of the lens $L_2$, while the light from a top Su of the object Ob advance as shown by the double arrow rays, which are refracted parallel in the range TD and which advance downwardly as shown in the figure as they proceed. Having passed through the convex lens $L_2$, the parallel rays converge at a point Su′, lower than the focal point $P_{f2}$ of the convex lens $L_2$ by the amount of the height h of the object Ob. While in FIG. 1A only rays from the lower end and upper end of the object Ob are shown, all rays from the object Ob are passed through the lens $L_1$, become parallel in the area TD and then converge at one point a distance $f_2$ from the lens $L_2$. Thus the image Im of the Object Ob appears at the position which is a distance $f_2$ from the lens $L_2$.

Figure 1B:
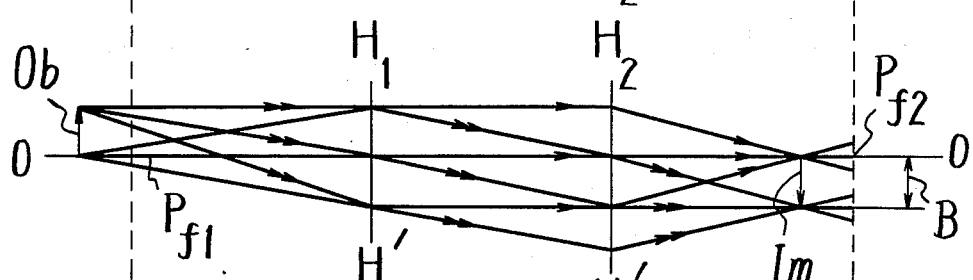
Figure 1C:
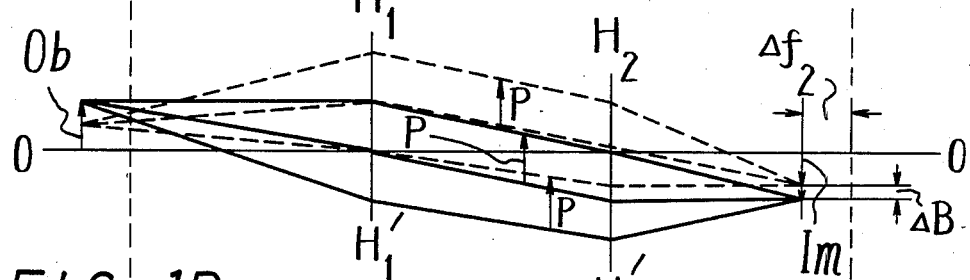

However, as, shown by solid lines in FIGS. 1B and 1C, when the object Ob is located at a position more distant from the lens $L_1$ than the focal point $P_{f1}$, rays from the respective points of the object Ob converge and hence are not parallel in the area TD between the lenses $L_1$ and $L_2$. After having passed through the lens $L_2$, the rays converge at a position nearer the lens $L_2$ than the focal point $P_{f2}$ of the lens $L_2$, namely, in front of the focal point $P_{f2}$.

Figure 1D:
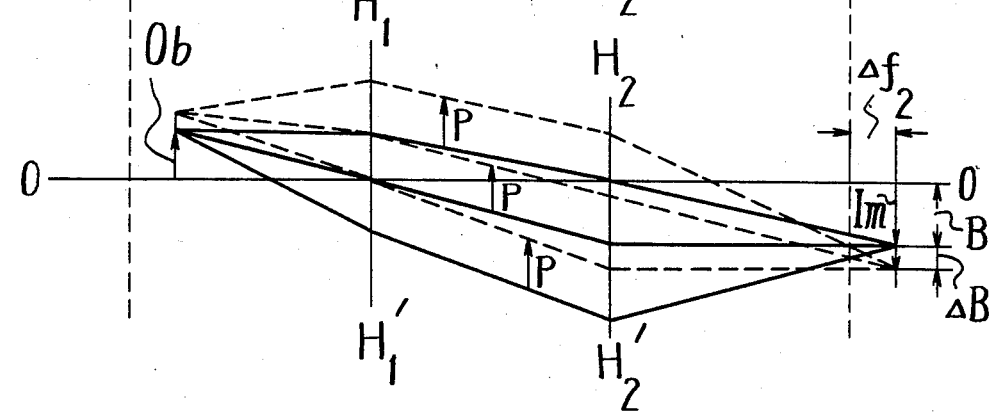

Furthermore, as shown by the solid lines in FIG. 1D, when the object Ob is positioned nearer to the lens $L_1$ than the focal point $P_{f1}$ of the lens $L_1$, rays from respective points of the object Ob diverge in the area TD between the lenses $L_1$ and $L_2$ and therefore they are not parallel. After having passed through the lens $L_2$, the rays converge behind the focal point $P_{f2}$.

When the rays shift perpendicularly to the optical axis O—O in the area TD, where the rays from the object Ob become parallel when in focus, the rays are disposed as follows. First, when the object Ob is positioned at the focal point $P_{f1}$ of the lens $L_1$, the rays from the object Ob become parallel in the afore-described area TD. Accordingly, even if the respective parallel rays are shifted in a direction perpendicular to the optical axis O—O, no change will occur in the position of the respective points behind the lens $L_2$ where the rays converge. Therefore, the position of the image Im will not change at all.

Whereas, as shown in FIGS. 1C and 1D, when the object Ob is at the position displaced from the focal point $P_{f1}$ of the lens $L_1$ and is unfocussed, the rays from the respective points of the object Ob do not become parallel in the area TD. Then, if the respective rays, which are not parallel, are shifted perpendicularly to the optical axis O—O (Where P represents a shift amount), the rays converge at different points on the plane perpendicular to the optical axis O—O behind the lens $L_2$. Practically speaking, as shown in FIG. 1C, when the object Ob is at the position behind the focal point (hereinafter simply referred to "over-focus"), the respective points at which the rays converge in relation to the optical axis O—O so that the height B of the image Im is reduced. Conversely, as shown in FIG. 1D, when the object Ob is at the position in front of the focal point (similarly, hereinafter simply referred to "under-focus"), the height B of the image Im is increased as shown in the figure. The change $\Delta B$ in the height B of the image Im is expressed by the following equation, in which the change $\Delta B$ is in proportion to a displacement amount $\Delta f_2$ between the position at which the image Im is formed and the focal point $P_{f2}$ of the lens $L_2$.

$$\Delta B = \frac{P}{f_2} \Delta f_2$$

As described above, in the unfocussed state, if the rays are shifted in parallel in the direction perpendicular to the optical axis O—O within the area TD between the lenses $L_1$ and $L_2$, the respective positions at which the images are formed are displaced on the plane perpendicular to the optical axis O—O.

Utilizing such optical principle effectively, this invention provides, a method and an apparatus for detecting the distance to an object. That is, in accordance with this invention, light passed through the lens $L_1$, is separated into a plurality of the light bundles and the separated light bundles are shifted perpendicularly to the optical axis O—O of the lens $L_2$ so as to pass through different positions of the lens $L_2$, by which at least in an unfocussed stated, multiple images can be produced.

Then, a positional relation of the multiple images are detected so as to detect the manner in which the object and the focal point is displaced, namely, whether under-focussed or over-focussed and by how much.

In this invention, as described above, it is necessary to separate the light bundle passed through the lens $L_1$ into plural light bundles and to shift the separated light bundles in parallel relative to the lens $L_2$ so as to pass the separated light bundles through different positions of the lens $L_2$. While, various means can effect the above required process, it is considered most appropriate to use a mirror, and the described embodiments of this invention utilize such a mirror effectively. A means for separating the light bundles by using a mirror and for shifting the separated light bundles in parallel with respect to the lens $L_2$ will next be described with reference to FIGS. 2A to 2C.

FIGS. 2A to 2C are diagrams each schematically showing the locus of the light from the object Ob under the state that two lenses $L_1$ and $L_2$ are located with their principal planes $H_1$—$H_1'$ and $H_2$—$H_2'$ substantially perpendicular to each other and a mirror M, which reflects the light passed through the lens $L_1$ from the object Ob to the lens $L_2$, is arranged at an angle of substantially 45° to the principal planes $H_1$—$H_1'$ and $H_2$—$H_2'$ of the above lenses $L_1$ and $L_2$.

When the object Ob is positioned at the focal point $P_{f1}$ of the lens $L_1$ as shown in FIG. 2A, light from the respective points of the object Ob and passed through the lens $L_1$ become the parallel light bundles. The respective parallel light bundles are reflected by the mirror M toward lens $L_2$ and then collected or converged on the focal point $P_{f2}$ of the lens $L_2$ as the image Im. Thus the image Im of the object Ob is formed at the focal point $P_{f2}$ of the lens $L_2$.

By the way, even if the position of the mirror M is parallelly shifted to the right by a predetermined amount P along the direction of the optical axis of the lens $L_1$ as shown by a broken line M' in FIG. 2B, in the focussed state, the light from the object Ob, which passes through the lens $L_1$ and is then reflected by the mirror M' to the lens $L_2$ still becomes the parallel light bundles in the area between the lenses $L_1$ and $L_2$, so the positions at which the light bundles are collected do not change at all.

Whereas, when the object Ob is at the position distant from the focal point $P_{f1}$ of the lens $L_1$, namely, behind the focal point $P_{f1}$ as, for example, shown in FIG. 2C, the light passed through the lens $L_1$ from the respective points of the object Ob do not become the parallel light bundles. Accordingly, if the mirror M is parallelly shifted to provide a parallel shift of the light bundles as described above, the positions at which the light bundles converge are displaced on a plane perpendicular to the optical axis of the lens $L_2$ in accordance therewith. The direction in which the positions of the converged light bundles are displaced is different depending on whether the object is in front of or behind the focal point as shown in FIG. 2C. Moreover, the displacement amount $\Delta B$ of the converged light bundles is in proportion to the displacement amount $\Delta f_2$ between the focal point $P_{f2}$ of the lens $L_2$ and the converged points. Consequently, if a half mirror is placed at the position M shown by the solid line and a full mirror is placed at the position M' shown by the broken line in FIGS. 2B and 2C, it is possible to obtain a double image at least in the unfocussed state of the lenses. The aforesaid principle is effectively utilized in the embodiments of an apparatus for detecting a distance to an object according to this invention.

Hereinafter, embodiments of an apparatus according to this invention will be described in detail with reference to the attached drawings.

Figure 3:
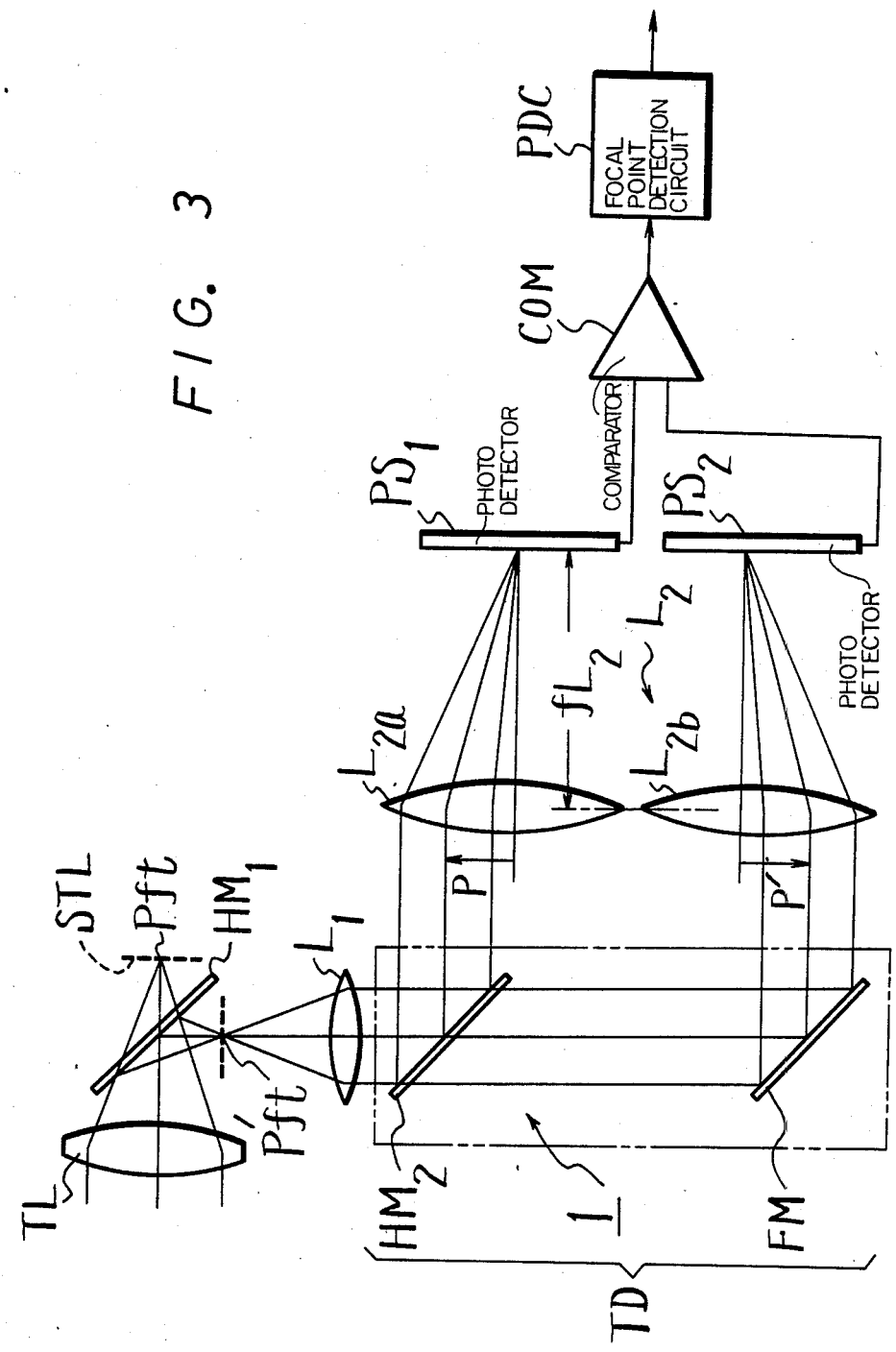
FIG. 3 is a schematic diagram showing an overall arrangement of one embodiment of an apparatus for detecting distance to an object according to this invention.

FIG. 3 and FIGS. 4A to 4C are diagrams showing a first embodiment of an apparatus of this invention being applied to, for example, a still camera. In FIG. 3, reference TL denotes an imaging or a taking lens and on the focal point $P_{ft}$ thereof opposed to an object is formed a principal image formation screen STL shown by a broken line, on which a photosensitive material such as film or the like (not shown) is located. Reference $HM_1$ denotes a half mirror which is positioned between the taking lens TL and the principal image formation screen STL. The reflection face of the half mirror $HM_1$ forms an angle of substantially 45° with the principal plane of taking lens TL. Reference $L_1$ denotes a lens which is so located that it receives the light rays from the taking lens TL and the half mirror $HM_1$ and that its principal plane forms an angle of 45° with the reflecting face of half mirror $HM_1$. This lens $L_1$ is located at a distance equal to its focal length $f_1$ from a sub-image formation plane $P_{ft}'$ produced by the half mirror $HM_1$ and corresponding to the image screen STL. Consequently, the light bundles passed through the lens $L_1$ from the respective points of the object become parallel light bundles in the focussed state of the imaging or taking lens TL.

Therefore, the area on the side of the lens $L_1$ opposite to the half mirror $HM_1$, namely, the lower side of the lens $L_1$ in FIG. 3, becomes an area TD where the light rays from the respective points of the object become the parallel light bundles in the focussed state. Within the area TD is located a half mirror $HM_2$ disposed obliquely to the optical axis of the lens $L_1$ at an angle of 45° at a proper distance from the lens $L_1$. A full mirror FM is disposed parallel to and apart from the half mirror $HM_2$ at a proper distance in the direction in which the light bundles advance. As a result, part of the light passed through the lens $L_1$ is reflected by the half mirror $HM_2$ and the rest, having passed through the half mirror $HM_2$, is reflected by the full mirror FM. In this case, the reflected lights from the half mirror $HM_2$ and the full mirror FM are substantially parallel to each other. Thus, the half mirror $HM_2$ and the full mirror FM constitute separating means 1 for separating the light rays passing through the area TD into two light rays bundles. This means 1 is conveniently sometimes called a light bundle separating means in this specification.

In FIG. 3, reference $L_{2a}$ denotes a lens for receiving at its upper half the light from the half mirror $HM_2$ while reference $L_{2b}$ denotes a lens for receiving at its lower half the light from the full mirror FM. In this case, the lenses $L_{2a}$ and $L_{2b}$ are so located that they form an angle of 45° with the half mirror $HM_2$ and the full mirror FM, respectively. The positional relations between the lenses $L_{2a}$ and $L_{2b}$ and among the lens $L_1$, the half mirror $HM_2$ and the full mirror FM satisfy the following conditions, in which the light passing through the optical axis of the lens $L_1$ is used as an example. A part of the light reflected by the half mirror $HM_2$ passes through the lens $L_{2a}$ at a position displaced by a distance P from the optical axis of the lens $L_{2a}$ in FIG. 3. The rest of the light, which is passed through the half mirror $HM_2$, is reflected by the full mirror FM through the lens $L_{2b}$ at a position displaced by a distance P' from the optical axis of the lens $L_{2b}$ in FIG. 3. This can be regarded as being the same as a system in which the two lenses $L_{2a}$ and $L_{2b}$ constitute one lens $L_2$, and a light ray passing through the lens $L_1$ at the same point introduced into the lens $L_2$ at points which are a distance $P+P'$ from one another, resulting in a substantially similar effect to the positional relation between the lens $L_2$ and the mirror M in FIGS. 2A to 2C; in connection with which the effect of shifting the mirror M by a distance P perpendicularly to the optical axis of the lens $L_2$ was described. The displacement amount P in FIGS. 2A to 2C would correspond to the distance $P+P'$ in the embodiment of this invention shown in FIG. 3.

In FIG. 3, references $PS_1$ and $PS_2$ respectively designate photo detectors or sensors which are located parallel to each other and distant from the lenses $L_{2a}$ and $L_{2b}$ by the focal length $f_{L2}$ of the lenses $L_{2a}$ AND $L_{2b}$. The photo detectors or sensors $PS_1$ and $PS_2$ are charge coupled devices (CCD), light sensors or the like, in which, as shown in FIGS. 4A to 4C, a number of light sensing members or receiving elements 2, 2, . . . are serially arranged along the direction (vertically in the embodiment of FIG. 3) in which the two light bundles, separated by the light bundle separating means 1, will be shifted.

FIGS. 4A to 4C are front views each illustrating the photo detectors $PS_1$ and $PS_2$. In the focussed state, as shown in FIG. 4A, the light rays from the object are collected to form the image on the light sensing or receiving screen of the central light sensing member $2_0$ of the photo detectors $PS_1$ and $PS_2$.

Turning back to FIG. 3, reference COM designates a comparator for comparing the output signals from the photo detectors $PS_1$ and $PS_2$, and reference PDC designates a focal point detection circuit which receives the output signal from the comparator COM to detect the focal point.

In the apparatus for detecting a distance to an object as illustrated in the figures, in the focussed state, at the central light sensing member $2_0$ of the photo detectors $PS_1$ and $PS_2$ are respectively formed the images of the object as described above. Whereas, in an unfocussed state, the light rays from the respective points of the object and passed through the area TD, in which the light bundle separating means 1 is provided, do not become parallel light bundles, but light bundles which tend to converge or diverge. Even though the light bundles reflected by the half mirror $HM_2$ and the light bundles reflected by mirror FM both passed through the lens $L_1$, those two light bundles are incident on the lens $L_2$ at different positions. (It will be recalled that the lens $L_2$ can be regarded as substantially one lens $L_2$ even though it is formed of two physically independent lenses $L_{2a}$ and $L_{2b}$.)

Therefore, as is clear from the principle of operation shown in FIGS. 2A to 2C, the image formation positions of the object on the photo detectors $PS_1$ and $PS_2$ are displaced. The light bundles reflected by the half mirror $HM_2$ are displaced upwardly from the optical axis of the lens $L_2$ in FIG. 3 while the light bundles reflected by the full mirror FM are displaced downwardly from the optical axis of the lens $L_2$ in FIG. 3, so that the displacement directions are opposite to each other. Accordingly, as shown in FIG. 4B or 4C, when the position at which the image is formed on the one photo detector PS is upwardly displaced, the position at which the image is formed on the other photo detector PS is downwardly displaced. Thus, the displacement of the position at which the image is formed depends on whether the focal point is under-focus or over-focus and whether the focal point is under-focus or over-focus can be detected by detecting in which direction the image is displaced. See FIGS. 4B and 4C. Moreover, by detecting the amount of displacement of the image on the photo detectors, it is possible to detect the displacement amount of the focal point. Accordingly, the signals accumulated in the respective light sensing members 2, 2, . . . , in the two photo detectors $PS_1$ and $PS_2$ are sequentially shifted, compared by the comparator COM, and the output signal therefrom is processed by the focal point detection circuit PDC to detect which of the states shown in FIGS. 4A to 4C is present and thus which of the states of in-focus, under-focus or over-focus is present. Moreover, since the image displacement amount $\Delta B$ increases more and more as the light sensing members 2, 2, . . . , at which the image is formed gets farther away from the central light sensing members $2_0$, the displacement amount B can be also detected by the focal point detection circuit PDC. Accordingly, the taking lens can be moved in response to the detected result to permit the object to be in focus and an automatic focussing operation becomes possible.

Figure 5:
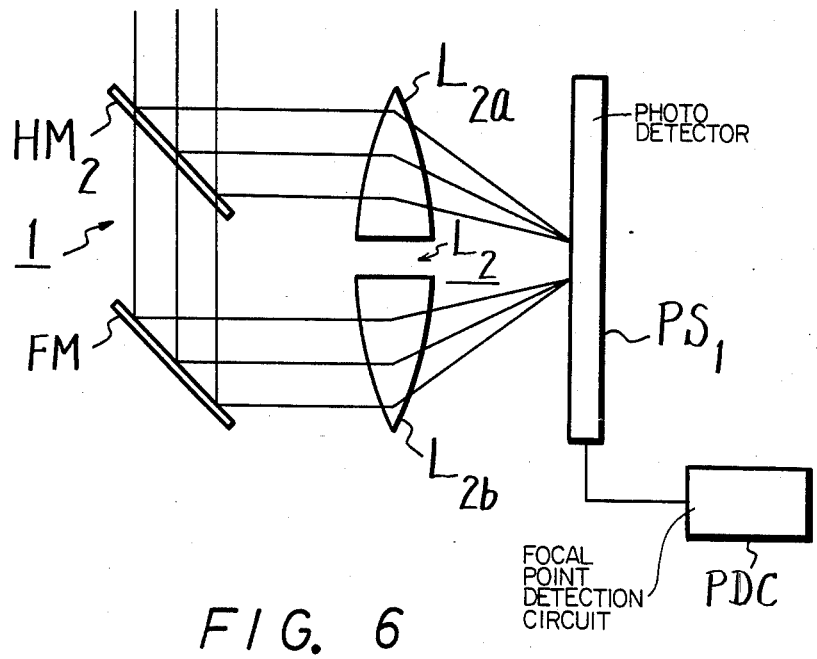
FIG. 5 is a schematic diagram showing another embodiment of an apparatus according to this invention.

Since the distance between the optical axes of the two lenses $L_{2a}$ and $L_{2b}$ is relatively large in the light bundle separating means 1 in the embodiment of FIG. 3, two photo detectors $PS_1$ and $PS_2$ are required. FIG. 5 shows a modified example of the lens $L_2$ and the photo detector PS. That is, in FIG. 5 the halves of the two lenses $L_{2a}$ and $L_{2b}$ which are not used are removed to reduce the distance between the optical axes of the lenses $L_{2a}$ and $L_{2b}$. Thus, the two images made by the two lenses $L_{2a}$ and $L_{2b}$ are made on one photo detector $PS_1$. Since only one photo detector $PS_1$ is required to provide the same effect, the number of parts can be reduced and the apparatus can therefore be made more compact. In this case, the optical axes of two lenses $L_{2a}$ and $L_{2b}$ do not have to be parallel to each other, but the positions of the image formation in the focussed state on the photo detector $PS_1$ can be made close to or far away from each other by adjusting the relative location of the two optical axes.

Figure 6:
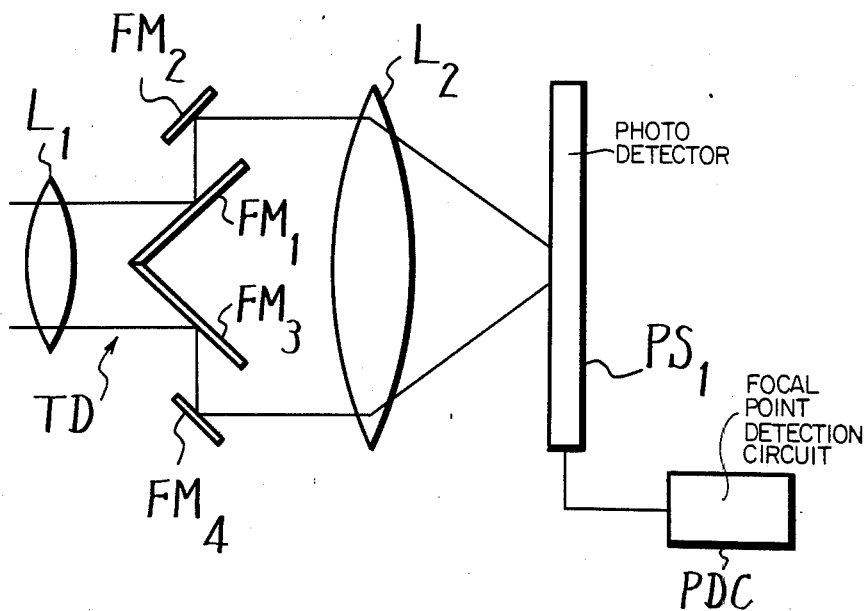
FIG. 6 is a schematic diagram showing a still further embodiment of an apparatus according to this invention.
Figure 7:
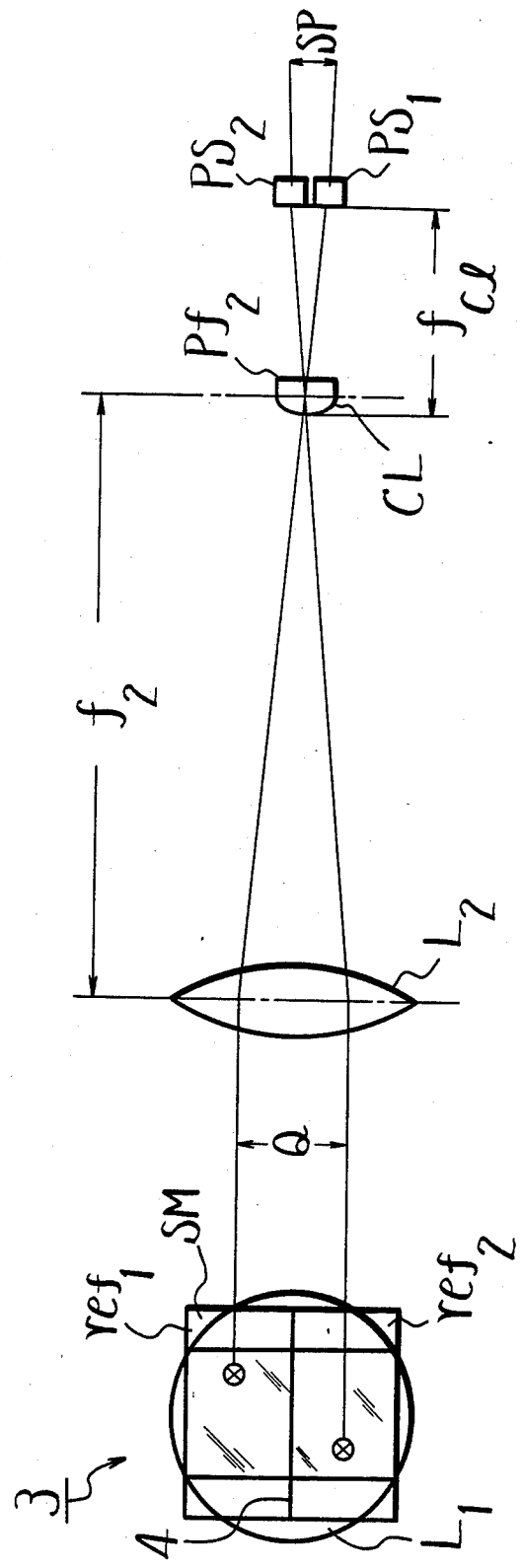
FIG. 7 is a side view schematically showing an overall arrangement of another embodiment of an apparatus according to this invention.

FIG. 6 is a schematic diagram showing yet another embodiment of the lens $L_2$ and the photo detector $PS_1$. In this embodiment, part of the light rays passed through the lens $L_1$ is first reflected by a full mirror $FM_1$ toward a full mirror $FM_2$, and the reflected light is further reflected by the mirror $FM_2$ (to the right in FIG. 6) to pass through the upper half of a single lens $L_2$ in FIG. 6 and then to the photo detector $PS_1$. The part of the light incident on a full mirror $FM_3$ from the lens $L_1$ is reflected toward a full mirror $FM_4$, which reflects it through the lower half of the lens $L_2$ and then to the photo detector $PS_1$. As described above, through the use of four full mirrors $FM_1$, $FM_2$, $FM_3$ and $FM_4$, one light bundle can be separated to two light bundles which are shifted in parallel to each other.

The embodiments of FIGS. 5 and 6 are suitable for a case where it is necessary to locate the photo detector $PS_1$ behind the lens $L_1$.

FIGS. 7 to 9 and FIGS. 10A to 10C are diagrams each showing a further embodiment of the present invention.

In this second embodiment, a step mirror SM is used as a separating means 3 for separating the light bundle which is passed through the lens $L_1$ into two light bundles and for shifting the separated light bundles parallelly with respect to the optical axis of the lens $L_2$ (hereinafter, for convenience sake, called simply "a light bundle separating and parallelly shifting means). The step mirror SM includes reflection faces $ref_1$ and $ref_2$ which are adjacent to each other across a step portion 4 on two different but parallel planes.

As illustrated in FIG. 9, the step mirror SM can easily be formed such that a reflection film is coated on one half of the front surface, for example, the lower half surface 6 of a transparent plate 5 made of glass or synthetic resin to form the reflection face $ref_2$, while a reflection film is coated on the other half portion at the back of the transparent plate 5 to form the reflection face $ref_1$. The light passed through the lens $L_1$ is reflected toward the lens $L_2$ by the two reflection faces $ref_1$ and $ref_2$ of the step mirror SM.

Reference CL represents a cylindrical lens having a gutter shape located at the other side of the lens $L_2$ relative to the step mirror SM and at the focal point $P_{f2}$ of the lens $L_2$. The lens $L_2$ extends in the horizontal direction (the direction from the surface of the sheet of the drawings to the back thereof on FIG. 7 or the vertical direction as shown in FIG. 8). The cylindrical lens CL functions to separate the light converged therein from the reflection faces $ref_1$ and $ref_2$, allowing two images to separately be formed on the photo detectors $PS_1$ and $PS_2$.

The photo detectors $PS_1$ and $PS_2$ are disposed parallel to the cylindrical lens CL at a distance equal to the focal length $f_{CL}$ of the cylindrical lens CL. The photo detectors $PS_1$ and $PS_2$ are also vertically spaced apart from each other in such a manner that the distance SP between the centers of the respective light sensing screens thereof satisfies the following equation:

$$SP = f_c \cdot Q / f_2$$

where reference Q represents the distance between the center of the light bundle reflected by the reflection face $ref_1$ and the center of the light bundle reflected by the reflection face $ref_2$ in the focussed state.

Figure 10A:
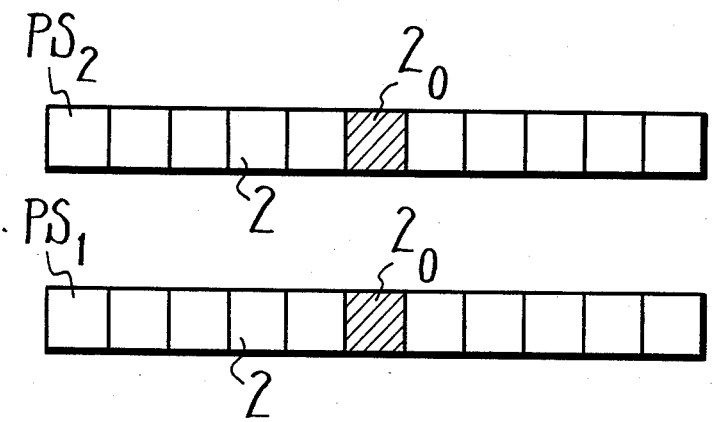
FIGS. 10A–10C show a photo detector used in the embodiment of this invention shown in FIGS. 7–9.

In the apparatus for detecting a distance to an object according to embodiment of the light passed through the lens $L_1$ and reflected by the step mirror SM, the light reflected by the reflection face $ref_1$ is collected by the upper half portion of the lens $L_2$ at the cylindrical lens CL, and is further projected by the cylindrical lens CL on the lower photo detector $PS_1$ while the light passed through the lens $L_2$ and reflected by the reflection face $ref_2$ is collected by the lower half portion of the lens $L_2$ at the Cylindrical lens CL, and is further projected by the cylindrical lens CL on the upper photo detector $PS_2$. In the focussed state or when the light passed through the lens $L_1$ from the object at its respective parts become respective parallel light bundles, the image of the object is formed on the light sensing members $2_0$ which are respectively located at the centers of the photo detectors $PS_1$ and $PS_2$ as shown in FIG. 10A. The two light bundles are correspondingly shifted by the amount P in the vertical direction as shown in FIG. 8.

Figure 10B:
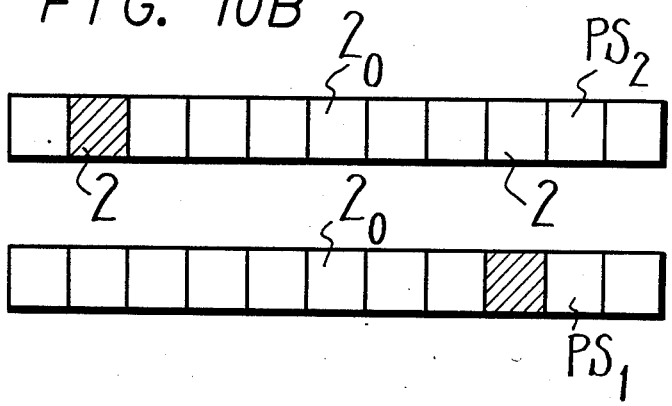
Figure 10C:
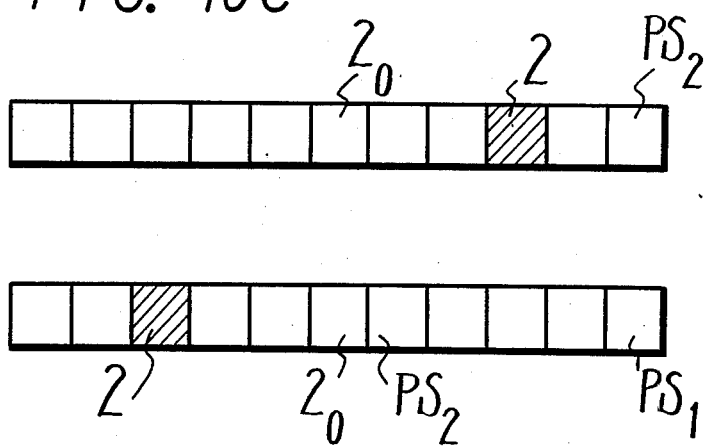

Therefore, in the under-focus or over-focus state, as shown in the front view of the photo detectors $PS_1$ and $PS_2$ in FIG. 10B or 10C, the positions of the image formation on the photo detectors $PS_1$ and $PS_2$ are displaced in the horizontal direction. Similarly as in the previous embodiments, by detecting which of the displacement patterns shown in FIGS. 10B and 10C is present, it can be determined whether under-or over-focus is present. Moreover, the amount of the focal point displacement can be detected by the amount of displacement of the position of the image formation. Accordingly, similarly to the first embodiment shown in FIGS. 3 and 4, the output signals from the photo detectors $PS_1$ and $PS_2$ are suitably processed to thereby enable the focal point to be detected automatically.

Furthermore, if the two photo detectors $PS_1$ and $PS_2$ are composed together or constructed integrally so as to form a unitary body, the number of parts can be reduced and the assembly processes can be simplified.

Figure 11:
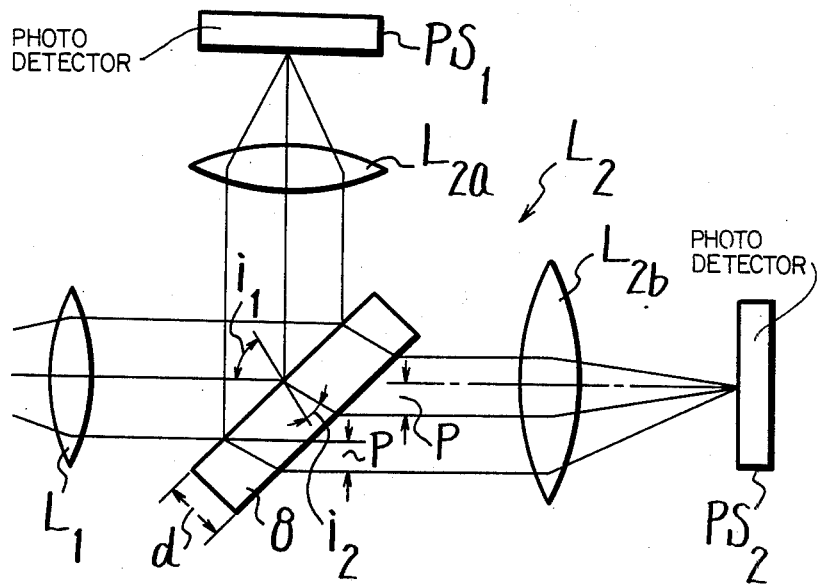
FIG. 11 is a schematic diagram showing another embodiment of an apparatus according to this invention.

FIG. 11 is a diagram schematically showing another embodiment of an apparatus for detecting a distance to an object according to this invention. In this embodiment, a transparent plate 8 is used as the light bundle separating and shifting means. The transparent plate 8 is located at an angle of 45° C. relative to the principal plane of the lens $L_1$ and the face of the plate 8 facing to the lens $L_1$ functions as a half mirror. Reference $L_{2a}$ designates the lens which receives the light reflected by the transparent plate 8 while reference $L_{2b}$ designates the lens which receives the light refracted and passed through the transparent plate 8. The lens $L_{2a}$ is located so that light passed through the optical axis of the lens $L_1$ and reflected by the reflection or transparent plate 8 passes through the optical axis of the lens $L_{2a}$. The lens $L_{2b}$ is located with its optical axis coincident with that of the lens $L_1$. Reference $PS_1$ designates the photo detector for receiving the light passed through the lens $L_{2a}$ and reference $PS_2$ designates the photo detector for receiving the light passed through the lens $L_{2b}$.

In accordance with the apparatus of this embodiment, of the light passed through the optical axis of the lens $L_1$, the light reflected by the transparent plate 8 and then introduced into the lens $L_{2a}$ is passed through the optical axis of the lens $L_{2a}$, while the light refracted by and passed through the transparent plate 8 and then introduced into the lens $L_{2b}$ is introduced into the lens $L_{2b}$ at the positions displaced from and in parallel to the optical axis of the lens $L_{2b}$. The displacement amount P thereof is expressed by the following equation.

$$P = \frac{\sin(i_1 - i_2)}{\cos i_1} \cdot d$$

where $i_1$ represents the incident angle of the light on the transparent plate 8, $i_2$ represents the refractive angle, and d represents the thickness of the transparent plate 8.

Accordingly, let it be assumed that the two lenses $L_{2a}$ and $L_{2b}$ comprise one lens $L_2$. Then, it can be considered that part of the light incident on the lens $L_2$ is substantially moved or shifted by the displacement amount P parallelly. Accordingly, if the output derived from the photo detector $PS_1$, which receives the light that was not shifted parallelly, and the output from the photo detector $PS_2$, which receives the parallelly shifted light, are compared, the distance to the object can automatically be detected as in the previously described embodiments of this invention.

Figure 12:
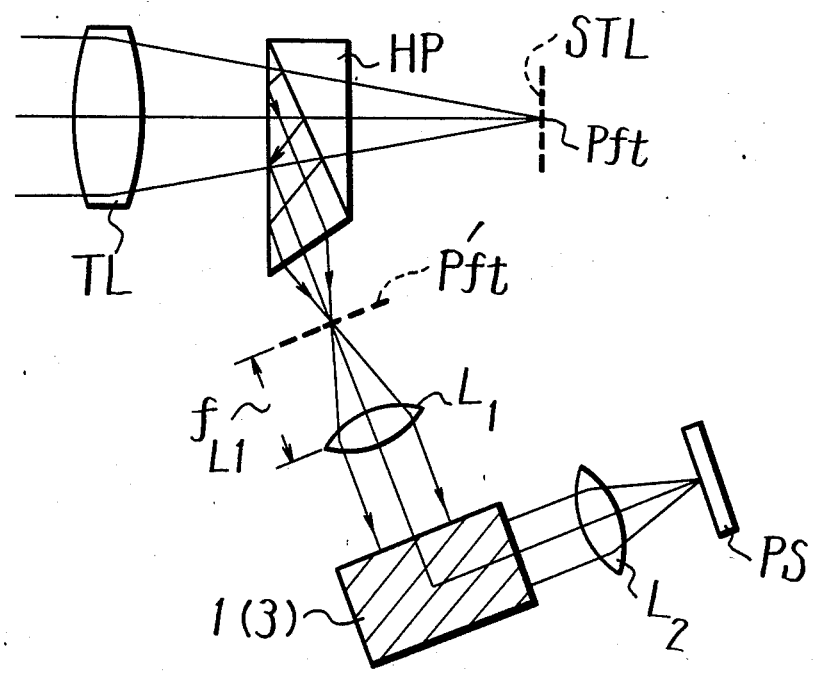
FIG. 12 to FIG. 14 are diagrams showing applications of an apparatus according to this invention.
Figure 13:
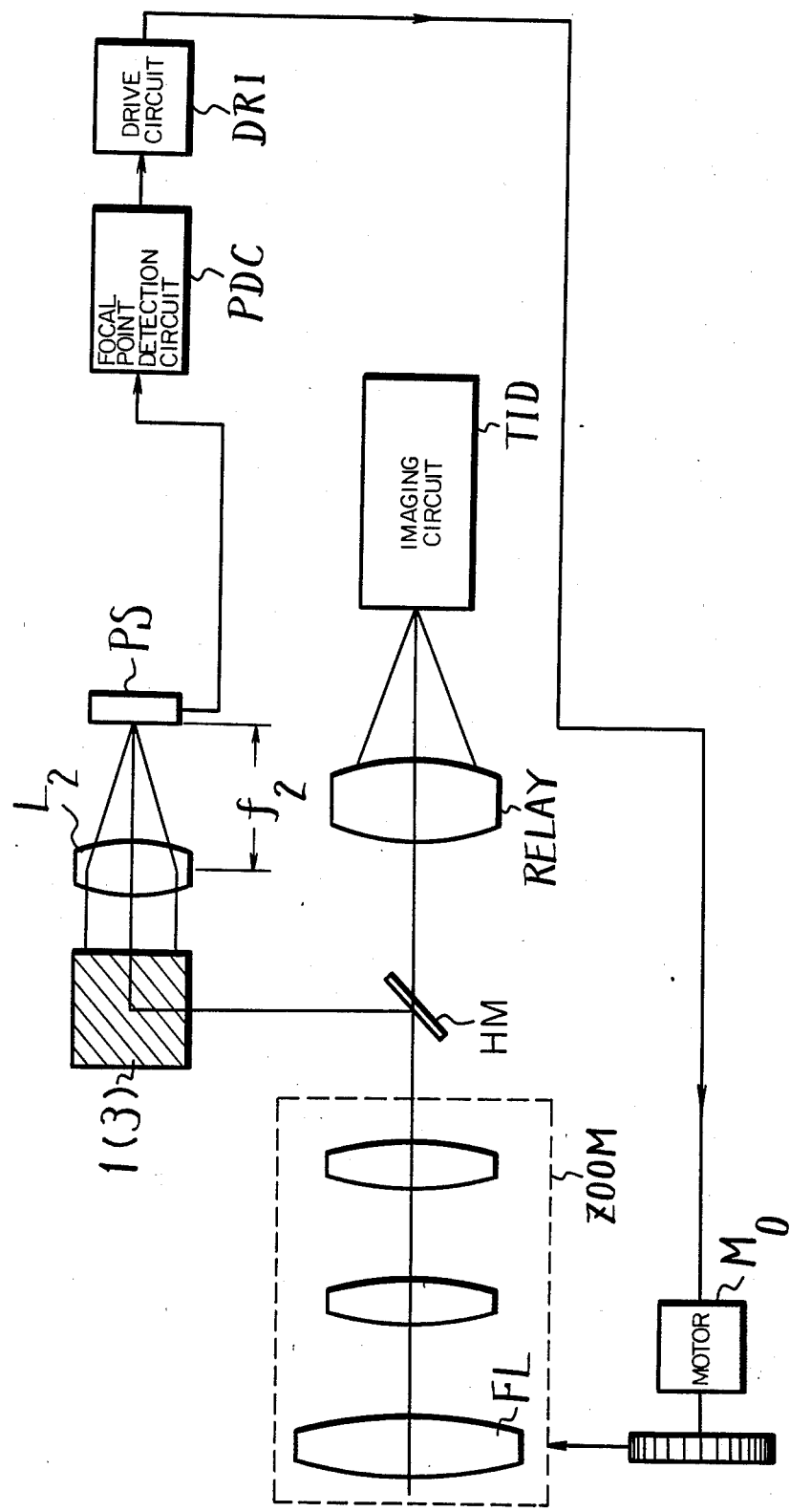
Figure 14:
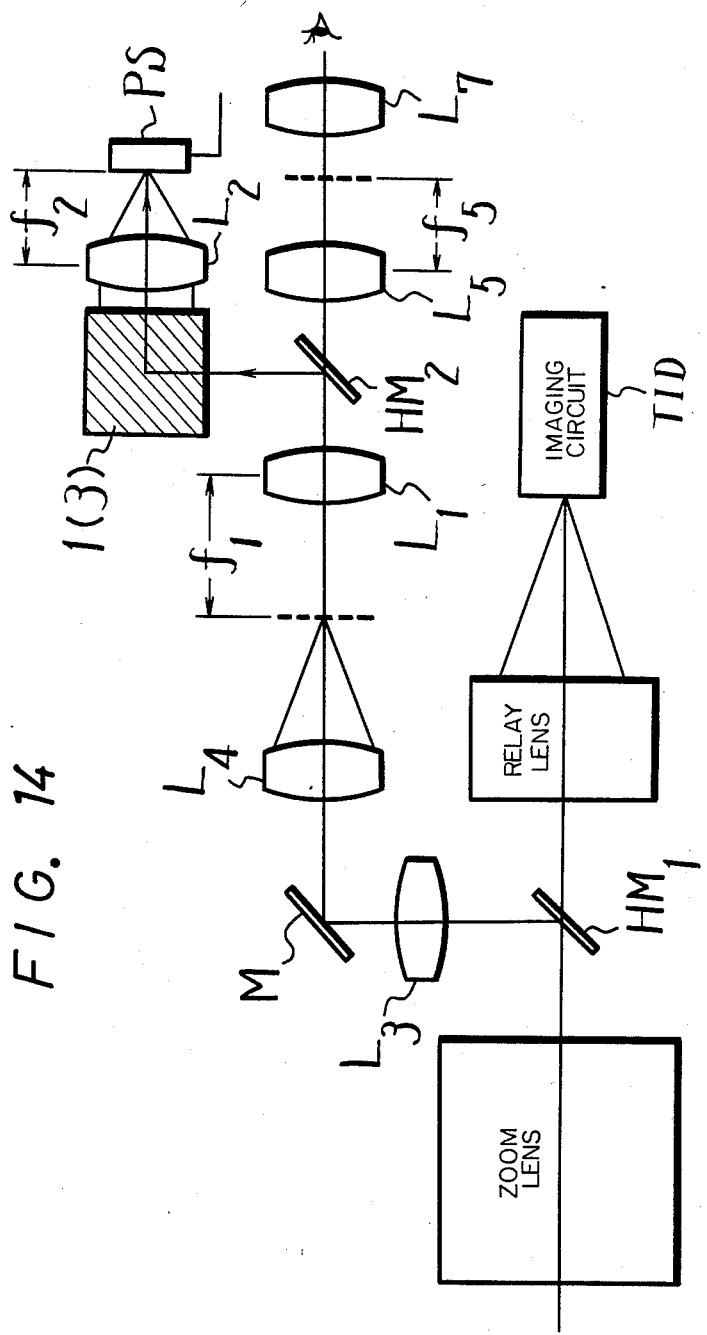

FIGS. 12 through 14 are diagrams showing applications of the apparatus of this invention.

FIG. 12 shows an embodiment in which a half prism HP is employed to provide part of the light travelling to the image formation screen STL from the taking lens TL. In this embodiment, the lens $L_1$ permits the light rays from the respective points of the object to be parallel to the optical axis of the lens $L_1$ in the focussed state, as shown in FIG. 3. On the opposite side of the lens $L_1'$ with respect to the half prism HP are suitably located the light bundle separating means 1 or the light bundle separating and parallelly shifting means 3, as previously discussed. The lens $L_2$ is used as above to form an image on a suitable photo detector means PS.

FIG. 13 shows the invention applied to a camera which employs a zoom lens. With this camera, in the focussed state, in the area between a zoom lens portion ZOOM and a relay lens portion RELAY, the light rays from the respective points of the object become the parallel light bundles, and a mirror HM is located in this area. In the path of the light reflected by the half mirror HM is located the light bundle separating means 1 or the like such as those in the afore-described embodiments, and the light from the separating means 1 or 3 is collected by the lens $L_2$ and directed to the photo detector means PS. The output from the photo detector PS is processed by the focal point detection circuit PDC and then transmitted to a driving circuit DRI which supplies driving current to a motor $M_0$ so as to rotate the same in a clockwise or counter-clockwise direction in response to the result of the focal point detection, thereby moving a focussing lens FL, which is located within the zoom lens member ZOOM. Reference TID designates a pick-up element or imager element such as a CCD or the like onto which the focussed image is projected for recording.

FIG. 14 is a diagram schematically showing a camera equipped with an optical viewfinder in which the apparatus according to this invention is included. In this example, part of the light travelling through an optical viewfinder system, which comprises lenses $L_3$, $L_4$, $L_1$, $L_5$, $L_7$, the half mirror $HM_2$ and the mirror M, is deflected and used to detect the focal point. More particularly, between the lenses $L_1$ and $L_5$ is located the half mirror $HM_2$, and in a position through which the light reflected by the mirror $HM_2$ passes is provided the separating means 1 or 3.

Another embodiment of this invention resides in the detection apparatus.

FIGS. 15 through 18 are diagrams used to explain the above further embodiment of this invention.

Figure 15:
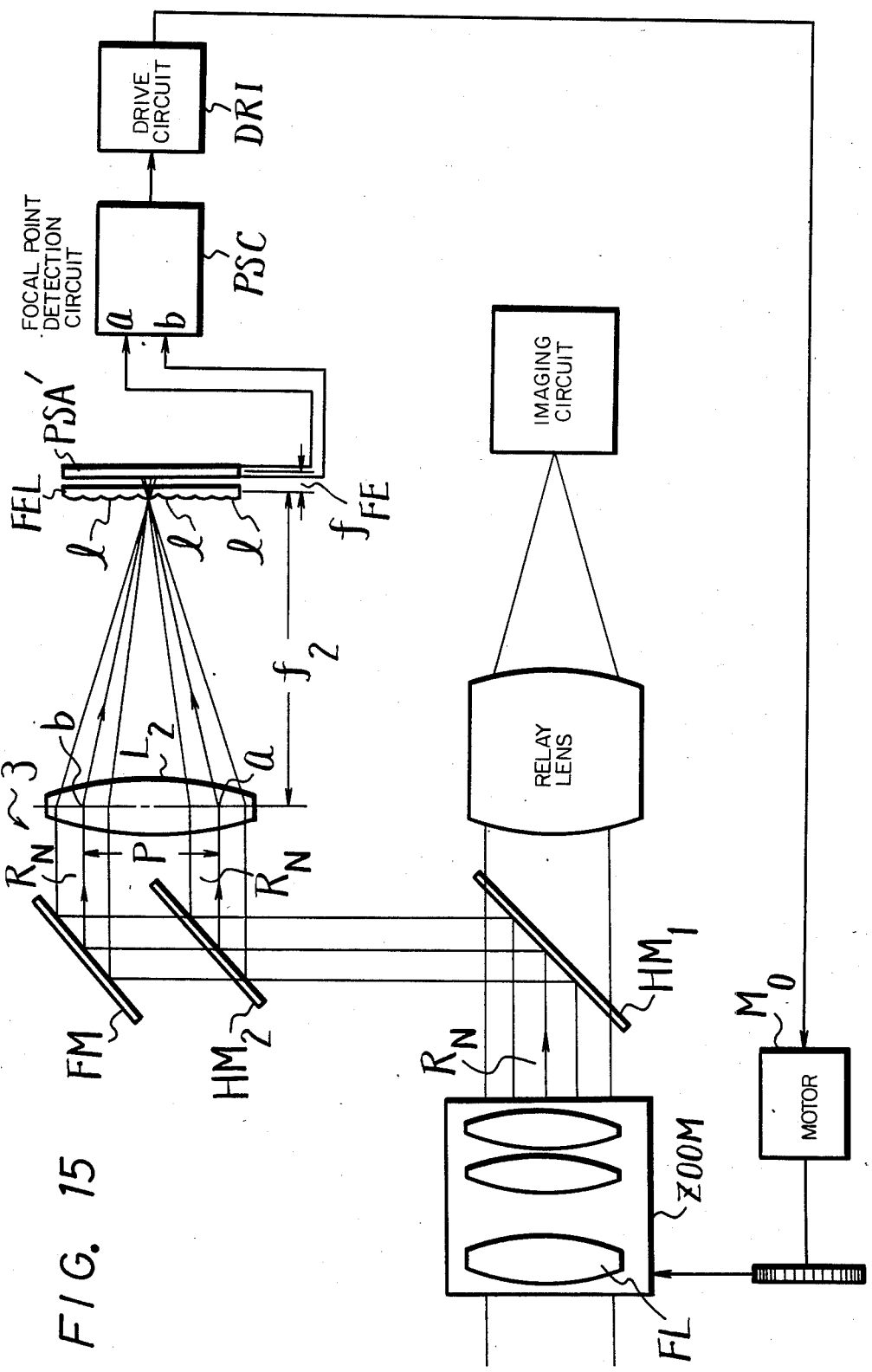
FIG. 15 is a diagram schematically showing another embodiment of an apparatus according to this invention.

In FIG. 15, reference ZOOM designates a zoom lens member the focal length of which can be varied by moving a focussing lens FL incorporated therein to the front and rear by a suitable drive means rotated by a motor $M_0$. RELAY denotes a relay lens member which converges the light from the zoom lens member ZOOM to form a focussed image of the object on the pick-up element TID. The light rays from the object at the respective points thereof become the parallel light bundles in the area between the zoom lens member ZOOM and the relay lens member RELAY in the focussed state. A half mirror $HM_1$ is located in that area to deflect part of the light from the light bundles which travel from the zoom lens member ZOOM to the relay lens member RELAY. The half mirror $HM_1$ is located at an angle of, for example, 45° relative to the optical axis of the zoom lens member ZOOM.

Reference $HM_2$ denotes the half mirror which is located so as to receive the light reflected by the half mirror $HM_1$. Reference FM denotes a full reflection mirror which is located parallel to the half mirror $HM_2$ to reflect all of the light passed through the half mirror $HM_2$. Thus, the light introduced to the half mirror $HM_2$ and then reflected thereby is parallel to the light reflected by the full reflection mirror FM. The half mirror $HM_2$ and the full reflection mirror FM constitute separating means for separating the light bundles emitted from the zoom lens member ZOOM into two light bundles, which are shifted perpendicularly to the optical axis of the lens $L_2$, namely, the light bundle separating and parallelly shifting means 3 as described hereinbefore.

Figure 16:
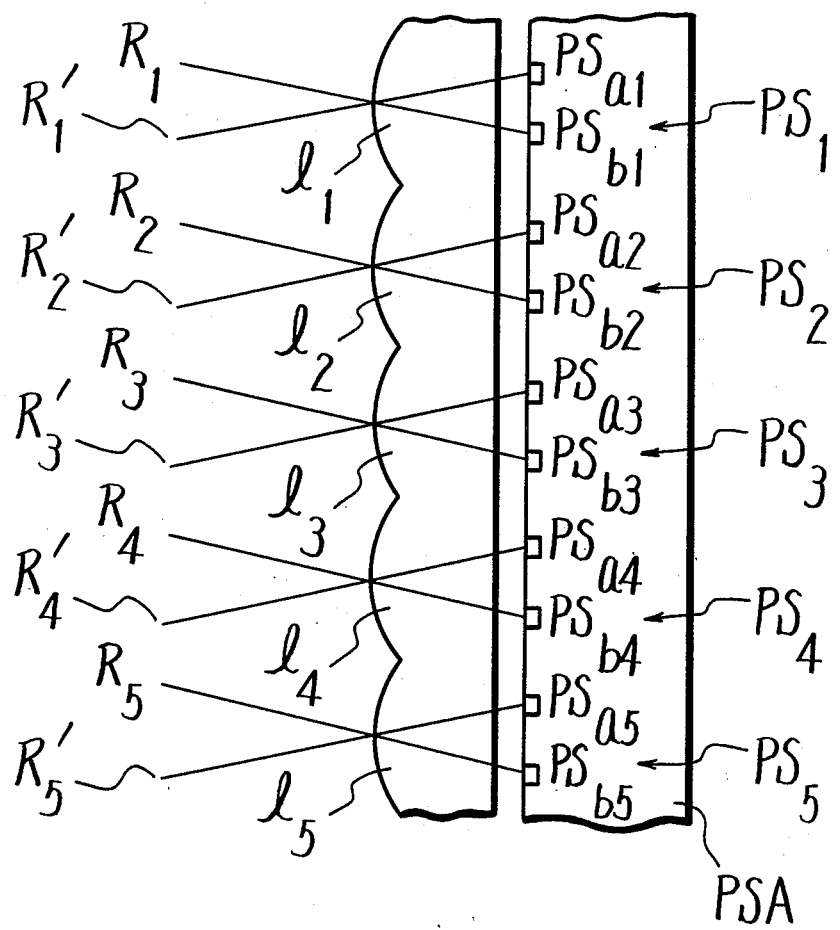
FIG. 16 is an enlarged diagram showing a structure of a fly-eye-lens and an image sensing member used in the embodiment of this invention shown in FIG. 15.

The lens $L_2$ is located so as to receive the light from the full reflection mirror FM at its half portion (in this embodiment, the upper half portion shown in FIG. 15) and also receive the light from the half mirror $HM_2$ at the other half portion (lower half portion in FIG. 15) and the light rays introduced thereto converge to form an image of the object. Reference FEL denotes a fly-eye-lens which consists of a number of very small lens elements l, l, ... formed together on a straight line and which is located at a distance from the lens $L_2$ equal to the focal length $f_2$ of the lens $L_2$ in such a manner that its lens elements l, l, ..., are arrayed in the vertical direction in FIG. 15. Hence in the focussed state, an image of the object is formed on the fly-eye-lens FEL. The fly-eye-lens FEL functions to separate the light rays converged on the respective lens elements l, l, ..., into the light rays from the upper half portion and the lower half portion of the lens $L_2$, thereby collecting the separated light rays on the places displaced vertically. Reference PSA denotes a photo sensor array located behind the fly-eye-lens FEL (to the right in FIG. 15), which is formed of, for example, CCD means. As shown in FIG. 16, the photo sensor array PSA comprises the light sensing members $PS_1$, $PS_2$, ..., which are respectively formed of a pair of light sensing elements $PS_{a1}$, $PS_{b1}$; $PS_{a2}$, $PS_{b2}$; ... located on a straight line with an interval or distance between them so that they correspond to l, l, ... of the fly-eye-lens FEL. The respective light sensing members $PS_1$, $PS_2$, ..., are thus located behind the corresponding lens elements l, l, ..., of the fly-eye-lens FEL.

One of the light sensing elements $PS_{a1}$, $PS_{a2}$, ..., of each pair of light sensing elements $PS_{a1}$, $PS_{b1}$; $PS_{a2}$, $PS_{b2}$, ... are located so as to receive light rays from the lower half portion of the lens $L_2$, which are converged by the corresponding lens elements l onto the light sensing members $PS_1$, ... on the fly-eye-lens FEL, while the other light sensing elements $PS_{b1}$, ... are located to receive the converged light rays from the upper half portion of the lens $L_2$.

Referring to FIG. 15 again, reference PSC denotes the focal point detection circuit which receives and processes the output signals from the photo sensor array PSA. That is, the focal point detection circuit PSC is supplied at its one input terminal a with the output signals from the light sensing elements $PS_{a1}$, $PS_{a2}$, ..., of one light sensing member $PS_1$, $PS_2$ ... and is also supplied at its other input terminal b with the output signals derived from the other light sensing elements $PS_{b1}$, $PS_{b2}$ ..., of the light sensing members $PS_1$, $PS_2$, ..., and can thus perform the various signal processing operations such as comparing the output signals and so on required to detect the focal point. Reference DRI denotes a driving circuit which receives the focal point detection signal from the focal point detection circuit PSC and produces the corresponding driving signal. Reference $M_0$ denotes the motor which is rotated by the driving signal derived from the driving circuit DRI in a clockwise or counter-clockwise direction to move the focussing lens FL within the zoom lens member ZOOM to the front and rear so the image is focussed on the TID.

The operation of the apparatus according to this embodiment will now be described.

In FIG. 15, most of the light from the zoom lens member ZOOM is passed through the half mirror $HM_1$ and into the relay lens member RELAY. Such light is converged by the relay lens member RELAY and an image of the object is formed on the light receiving screen of the pick-up element TID when the zoom lens member ZOOM is in focus. Part of the light passed through the zoom lens member ZOOM is reflected by the half mirror $HM_1$ toward the half mirror $HM_2$. Part of that reflected light is reflected by the half mirror $HM_2$ to the lower half portion in FIG. 15 of the lens $L_2$, while the rest of the light is passed through the half mirror $HM_2$ and is then reflected by the full reflection mirror FM toward the upper half portion of the lens $L_2$. The light rays reflected by the full reflection mirror FM to the lens $L_2$ are collected by the lens $L_2$ so that an image of the object is formed on the fly-eye-lens FEL in the focussed state. To be more concrete, the light from the respective points of the object in the focussed state are each respectively collected on different lens elements l, l, . . . , of the fly-eye-lens FEL. Of the collected light, the light rays from the lower half portion of the lens $L_2$ are collected by the lens elements l to form an image of the object on the upper light sensing element $PS_{a1}$, $PS_{a2}$, . . . . The light rays from the upper half portion of the lens $L_2$ are collected by the lens elements l to form the image of the object on the lower light sensing element $PS_{b1}$, $PS_{b2}$, . . . . As shown in FIG. 16, as to the light from the object at, for example, a certain point 1 thereof a light ray $R_1$ passed through the upper half portion of the lens $L_2$ as well as a light ray $R_1'$ passed through the lower half portion thereof are introduced together into one lens element $l_1$. While, as regards the light from the object at a point 2 adjacent to the afore-said point 1, a light ray $R_2$ passed through the upper half portion of the lens $L_2$ as well as a light ray $R_2'$ passed through the lower half portion of thereof are introduced together into the lens element $l_2$ adjacent to the lens element $l_1$ on which the light from the point 1 is incident. The light ray $R_1$ is introduced into the light sensing element $PS_{b1}$; the light ray $R_1'$ into the light sensing element $PS_{a1}$; the light ray $R_2$ into the light sensing element $PS_{b2}$; and the light ray $R_2'$ into the light sensing element $PS_{a2}$. In the like manner, light rays $R_3$, $R_3'$, $R_4$, $R_4'$, $R_5$, and $R_5'$ from the respective points 3, 4, and 5 of the object are introduced into the light sensing elements $PS_{b3}$, $PS_{a3}$, $PS_{b4}$, $PS_{a4}$, $PS_{b5}$ and $PS_{a5}$, respectively. Thus the light rays from the same point of the object are introduced into the light sensing elements $PS_a$ and $PS_b$ of the same light sensing member PS. Solid line curves in the graph of FIG. 18 indicate examples of the outputs from the respective light sensing elements in the focussed state, in which a solid line curve Wa indicates the output from the light sensing elements $PS_{a1}$, $PS_{a2}$, . . . , while a solid line curve Wb indicates the output from the light sensing elements $PS_{b1}$, $PS_{b2}$, . . . .

Figure 17A:
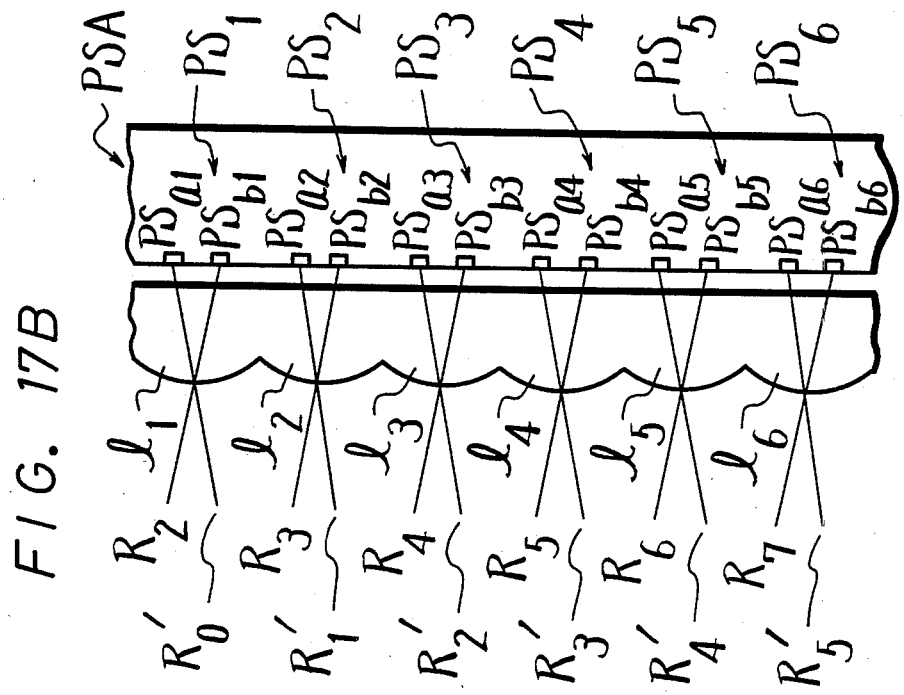
FIGS. 17A and 17B are enlarged diagrams showing a manner of how the light rays are introduced into the same fly-eye-lens and the image sensing members in the unfocussed state.
Figure 17B:
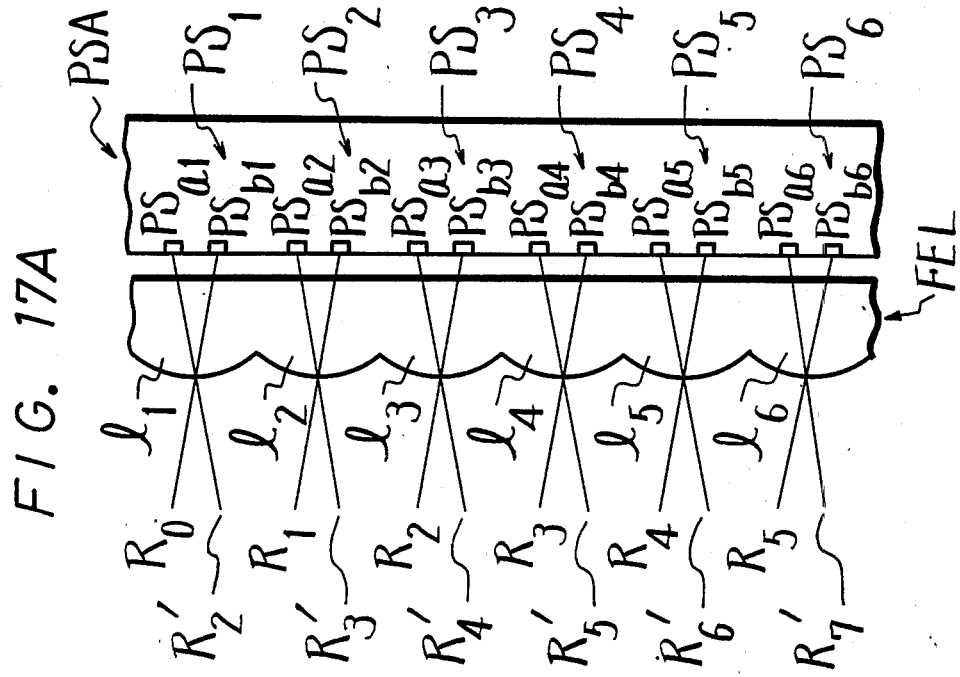

In an unfocussed state, even if the light rays from the respective points of the object are emitted from the zoom lens member ZOOM, they do not become parallel light bundles, so no image of the object is formed on the fly-eye-lens FEL even when they are collected by the lens $L_2$. Accordingly, as shown in FIGS. 17A and 17B, the light rays from the same point of the object are introduced into different lens elements l so that they are incident on the light sensing elements $PS_a$ and $PS_b$ of different light sensing members PS and PS. By the way of example, of the light rays $R_2$ and $R_2'$ from the point 2 of the object, one light ray $R_2$ is introduced into the light sensing element $PS_{b3}$ of the light sensing member $PS_3$ and the other light ray $R_2'$ is introduced into the light sensing element $PS_{a1}$ of the light sensing member $PS_1$ as shown in FIG. 17A. Similarly, the light ray $R_3$ is introduced into the light sensing element $PS_{b4}$; the light ray $R_3'$ into the light sensing element $PS_{a2}$; the light ray $R_4$ into the light sensing element $PS_{b5}$; the light ray $R_4'$ into the light sensing element $PS_{a3}$; the light ray $R_5$ into the light sensing element $PS_{b6}$; and the light ray $R_5'$ into the light sensing element $PS_{a4}$. In the unfocussed state, the light sensing elements into which the light from the same point of the object are introduced are shifted. The output from the light sensing elements $PS_{a1}$, $PS_{a2}$ . . . , in this case is indicated as the waveform denoted by a broken line Wa' in FIG. 18, resulting from shifting the output Wa to the left in the figure. Conversely, the output, indicated by a broken line Wb', from the light sensing elements $PS_{b1}$, $PS_{b2}$, . . . , presents the waveform resulting from shifting the output Wb to the right as shown in FIG. 18. Moreover, the position of the light sensing element at which the light from the same point of the object will sometimes be displaced in a direction reversed from that shown in FIG. 17A in such a manner as shown in FIG. 17B, in which the light ray $R_2$ is introduced into the light sensing element $PS_{b1}$ of the light sensing member $PS_1$; the light ray $R_2'$ into the light sensing element $PS_{a3}$; the light ray $R_3$ into the light sensing element $PS_{b2}$; the light ray $R_4$ into the light sensing element $PS_{b3}$; and the light ray $R_4'$ into the light sensing element $PS_{a5}$. Whether the light is introduced into the light sensing element in a fashion shown in FIG. 17A or 17B depends on whether the lens system is in the under-focus or over-focus state.

As described above, the focal point detection circuit PSC, which receives the output signal from the photo sensor array PSA, detects which of the states shown in FIG. 16, FIGS. 17A and 17B is present and, it is thus possible to precisely detect the focal point. Then, the driving circuit DRI, supplied with the focal point detection signal thus derived, generates the driving signal in response to the detected signal so as to rotate the motor $M_0$ in the clockwise or counter-clockwise direction, so that the motor $M_0$ moves the focussing lens FL, located within the zoom lens member ZOOM, to the front or rear thereby eliminating the displacement of the focal point.

In the apparatus of FIG. 15, since the light bundle separating and parallelly shifting means is comprised of the half mirror $HM_2$ and the full reflection mirror FM, the light from the zoom lens member ZOOM in the same direction is separated by the light bundle separating and parallelly shifting means into parallel light bundles which travel through the different positions of the lens $L_2$. In order to facilitate understanding, a light ray $R_N$, which is emitted from the zoom lens member ZOOM along its optical axis and which is then reflected by the half mirror $HM_1$, is discussed. The light ray $R_N$ is partially reflected by the half mirror $HM_2$ and passed through a portion a of the lens $L_2$ lower than the optical axis thereof in FIG. 15, while the rest of the light $R_N$ passed through the half mirror $HM_2$ is reflected by the reflection mirror FM and passed through a portion b of the lens $L_2$ higher than the optical axis thereof. This occurs irrespective to the F-number of the zoom lens member ZOOM. Now, let it be assumed that a distance between the points a and b is P. Then, the light reflected by the half mirror HM$_1$ are separated into two bundles of light which are shifted by the light bundle separating and parallelly shifting means 3, perpendicularly to the optical axis of the lens L$_2$, by the distance P. The pair of light sensing elements PS$_a$ and PS$_b$ constituting each of the light sensing members PS, PS, ..., have a suitable distance S$_P$ therebetween. This distance S$_P$ is expressed by the following equation.

$$S_p = \frac{f_{FE}}{f_2} \cdot P$$

where $f_{FE}$ represents the focal length of each of the lens elements of the fly-eye-lens FEL.

As will be clear from the above equation, the distance S$_P$ between the pair of the light sensing elements PS$_a$ and PS$_b$ is dependent on the amount P by which the separated parallel light bundles are shifted perpendicularly to the optical axis of the lens L$_2$, the focal length F$_2$ of the lens L$_2$ and the focal length $f_{FE}$ of each lens element of the fly-eye-lens FEL, none of which depend on the F-number of the zoom lens member ZOOM.

As described above, an apparatus for detecting a distance to an object according to this invention can be applied to various apparatus.

As stated above, the apparatus according to this invention comprises the first optical system for making the light rays from the respective points of the object parallel light bundles in the focussed state and the second optical system for collecting or converging the parallel light bundles passed through the first optical system on the light receiving screen of the photo detector. The light bundles pass through the first optical system at the same place and in the same direction and are separated into a plurality of light bundles. The separated light bundles are shifted in parallel with respect to the second optical system and thereby travel through different places of the second optical system. These separated light bundles are projected onto the light receiving screen of the photo detector, and in the unfocussed state form multiple images on the light receiving screen of the photo detector, whereby the displacement between the multiple images appearing on the light receiving screen of the photo detector can be detected and thus the distance to an object or focal point can be detected. Accordingly, when a photo detector comprising a number of light sensing elements, each having a small light receiving screen, formed together or integrally and arranged in a predetermined direction, is employed, the density of sampling points can be reduced and hence the precision of detection of the focal point can be improved considerably.

In principle, according to this invention, since the detection of focal point is conducted by detecting whether the light bundles, which pass through an area in which they will be made parallel light bundles in the focussed state, are parallel light bundles or converging or diverging light bundles, the result of detection will not depend on the diameter of the light bundle. Hence, precision of detection will not be varied by the position of an exit pupil of the taking lens which composes the taking optical system or the diameter of a diaphragm. Thus, it is not necessary to provide a special means for correcting the result of detection in dependence on the diameter of a diaphragm.

As is apparent from the afore-described equation $$\Delta B = P \cdot \Delta f_2 / f_2$$

the precision of detection does not depend on the F-number of the taking lens (the value resulting from dividing the focal length f of the taking lens by the diameter D of the diaphragm), but depends on only the lens L$_2$, namely, the focal length f$_2$, located between the light bundle separating and parallelly shifting means and the photo detector, and the parallel shift amount P of the light bundle.

Also, in accordance with this invention, the light passed through the taking optical system is used to detect the focal point or distance to an object, resulting in no parallax. Moreover, since no movable member is required to detect distance to an object, the mechanical arrangement and construction of apparatus are quite simple and therefore the apparatus according to this invention can be made compact. Particularly the apparatus of this invention shown in FIGS. 5 and 6 require only one photo detector so that the apparatus can be made much more compact.

In the apparatus of this invention equipped with the step mirror and the cylindrical lens, since two photo detectors are located in parallel, such two photo detectors can easily be formed together and hence this leads to much more compactness of this apparatus.

Moreover, the apparatus of this invention is especially suitable for use with a video camera, an eight-mm camera and so on which generally employ a zoom lens. That is, ordinarily, if an object, which is positioned far away from the camera, is to be picked-up by the camera, effectively utilizing the specific feature of the zoom lens incorporated therein, the distance to the object or the focal point has to be detected with considerably high precision. As a result, precision of detection of the focal point must be increased. In accordance with the apparatus of this invention, the more and more the zoom lens is utilized effectively, the larger the displacement amount ΔB between the multiple images in the unfocussed state becomes due to the image magnification function of the zoom lens, thus precision of detection is increased. Therefore, even when a distant object is picked-up by the zoom lens, automatic detection of focal point can be made satisfactorily enough to generate a fine image of the object. When the object is picked-up in a wide-angle lens mode, it is natural that the displacement amount ΔB between the multiple images in the unfocussed state should be reduced and the precision of detection should also be lowered thereby. However, since the wide-angle lens mode requires not so accurate focussing as compared with that of a telephoto lens mode, even if the camera is somewhat unfocussed, a relatively good image can be produced.

The respective embodiments as described above show part of this invention, but various modifications will be possible. Particularly as to the means for separating part of the light bundles, various modifications will be proposed. For example, in the case of using the half mirror and the full reflection mirror as described hereinbefore, the half mirror is replaceable by an optical filter, through which light in the area of specific wavelength is passed but the remaining light is reflected, and one of two photo detectors is so arranged as to have a characteristic which receives only the light with specific wavelength passed through such filter and reflected by the mirror.

The above description is given of the preferred embodiments of the invention, but it will be apparent that many modifications and variations could be effected by one skilled in the art without departing from the spirit or scope of the invention, so that the scope of the invention should be determined by the appended claims only.

I claim as my invention:

1. Apparatus for detecting the distance to an object comprising:
   an imaging lens for focussing light from the object;
   first lens means for forming the light from the object and passing through said imaging lens into a plurality of light rays which are parallel when the object is disposed at the focal point of said imaging lens and which converge and diverge an amount depending on the direction and amount of displacement of the object from the focal point of said imaging lens;
   separating means for separating said light rays from said first lens means into at least two bundles of light;
   second lens means for forming each said bundle of light into a separate image at a respective location depending on the amount of convergence and divergence of said light rays;
   light sensing means for sensing said locations of said images; and
   detecting means for detecting said locations of said images on said light sensing means and for generating an output varying with the displacement of said images from the locations thereof when the object is at the focal point of said imaging lens.

2. Apparatus according to claim 1; wherein said separating means includes a half mirror for reflecting a part of the light from said first lens means to said second lens means and for transmitting the rest of the light, and a full mirror for reflecting said rest of the light to said second lens means.

3. Apparatus according to claim 2; wherein said second lens means includes separate lenses one of which is disposed for receiving the reflected light from said half mirror and the other of which is disposed for receiving the reflected light from said full mirror.

4. Apparatus according to claim 1; wherein said separating means includes a first full mirror for reflecting a first portion of the light from said first lens means, a second full mirror for reflecting the light from said first full mirror to form a first light bundle for forming by said second lens means into a first image, a third full mirror for reflecting a second portion of the light from said first lens, and a fourth full mirror for reflecting the light from said third full mirror to form a second light bundle for forming by said second lens means into a second image shifted perpendicularly to the optical axis of said second lens relative to said first image.

5. Apparatus according to claim 1; wherein said separating means includes a mirror having first and second reflecting faces displaced relative to each other in the direction of the optical axis of said first lens means, and said light sensing means includes a cylindrical lens for directing the light from said first and second reflecting faces to first and second photo detectors, respectively, comprising said detecting means.

6. Apparatus according to claim 1; wherein said separating means includes a transparent glass panel having an entrance face and an exit face, said entrance face operating as a half mirror for reflecting a part of the light from said first lens means and refracting the rest of said light toward said exit face which further refracts said rest of the light.

7. Apparatus according to claim 1; wherein said light sensing means includes photo detector means comprising a plurality of light sensors and a fly-eye-lens arranged at the focal plane of said second lens means and having a plurality of lens elements for cooperating with said light sensors to provide images on said light sensors.

8. Apparatus according to claim 7; wherein each said light sensor includes a first and second light sensing element and has one of said lens elements associated therewith and each said first light sensing element detects an image resulting from said first bundle of light and each said second light sensing element detects an image resulting from said second bundle of light.

9. The apparatus of claim 1; wherein said second lens means has an optical axis; and wherein said separating means shifts at least one said bundles of light perpendicular to said optical axis.

10. Apparatus according to claim 1; further comprising focussing means for adjusting the focal length of said imaging lens, said focussing means being operable in response to the output of said detecting means to adjust said focal length substantially to coincide with the distance to the object.

11. Apparatus as in claim 10, wherein:
   said detecting means comprises a plurality of photosensors for detecting the locations of images focussed on said light sensing means; and
   said focussing means comprises a focal point detection circuit for providing a driving signal in response to the detection of the locations of said images by said photosensors, said driving signal being indicative of the displacement of said images from their locations when the object is at the focal point of the imaging lens, and drive means for moving said imaging lens in response to said driving signal.

12. An automatic focusing camera comprising:
   an imaging lens for focusing light from an object a predetermined distance from said imaging lens, said imaging lens having an adjustable focal length;
   first means for forming the light from the object and passing through said imaging lens into a plurality of light rays which are parallel when the object is disposed at the focal point of said imaging lens and which converge and diverge an amount depending on the direction and amount of displacement of the object from the focal point of said imaging lens;
   separating means for separating said light rays from said first lens means into at least two bundles of light;
   second lens means for forming said bundles of light into respective, separate images at respective locations depending on the amount of diversions and conversions of said light rays;
   light sensing means for sensing said location of said images;
   detecting means for detecting said locations of said images on said light sensing means and for generating an output varying with the displacement of said images from the locations thereof when the object is at the focal point of said imaging lens; and
   focussing means responsive to said output for adjusting the focal length of said imaging lens to coincide substantially with the distance to said object from said imaging lens.

13. A camera according to claim 12; further comprising an optical view-finding system in which the light from said imaging lens is deflected for viewing.

14. A camera according to claim 12; further comprising a zoom lens including said imaging lens and said first lens means.

15. A camera according to claim 12; further comprising means for recording movements of the object.

16. The apparatus of claim 12; wherein said second lens means has an optical axis; and wherein said separating means shifts at least one of said bundles of light perpendicular to said optical axis.

17. A method for detecting the distance to an object, comprising the steps of:

passing the light from the object through an imaging lens;

forming the light from the imaging lens into a plurality of light rays which are parallel when the object is positioned at the focal point of the imaging lens and which converge and converge an amount depending on the direction and amount of displacement of the object from the focal point of the imaging lens;

separating said plurality of light rays into a plurality of light bundles;

forming said bundles into respective, separate images at respective locations depending on the amount of diversions and conversions of said light rays; and detecting the amount of displacement of said images from the locations thereof when the object is at the focal point of said imaging lens.

18. The method according to claim 17; further comprising the steps of:

providing an output signal indicative of said amount of displacement; and adjusting the focal length of said imaging lens in response to said output signal to coincide with said predetermined distance to the object.

19. The method of claim 17; wherein said step of forming said light bundles is performed by passing said light bundles through a lens means having an optical axis; and said step of separating said plurality of light rays includes the step of shifting at least one of said light bundles perpendicular to said optical axis.

* * * * *